(12) United States Patent
Suzuki et al.

(10) Patent No.: US 11,955,615 B2
(45) Date of Patent: Apr. 9, 2024

(54) BATTERY-POWERED PORTABLE TOOL

(71) Applicant: MAKITA CORPORATION, Anjo (JP)

(72) Inventors: Hitoshi Suzuki, Anjo (JP); Masaaki Fukumoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/550,091

(22) Filed: Dec. 14, 2021

(65) Prior Publication Data

US 2022/0102772 A1 Mar. 31, 2022

Related U.S. Application Data

(62) Division of application No. 16/884,322, filed on May 27, 2020, now Pat. No. 11,233,282.

(Continued)

(30) Foreign Application Priority Data

Jun. 17, 2019 (JP) .................................. 2019-111774

(51) Int. Cl.
*H01M 10/61* (2014.01)
*H01M 10/44* (2006.01)
(Continued)

(52) U.S. Cl.
CPC ....... *H01M 10/615* (2015.04); *H01M 10/443* (2013.01); *H01M 10/486* (2013.01);
(Continued)

(58) Field of Classification Search
CPC .. H01M 10/486; H01M 10/48; H01M 10/482; H01M 10/615; H01M 10/617;
(Continued)

(56) References Cited

U.S. PATENT DOCUMENTS

| | | |
|---|---|---|
| 5,583,415 A | 12/1996 | Fernandez et al. |
| 5,795,664 A | 8/1998 | Kelly |

(Continued)

FOREIGN PATENT DOCUMENTS

| | | |
|---|---|---|
| CN | 1171169 A | 1/1998 |
| CN | 102005733 A | 4/2011 |

(Continued)

OTHER PUBLICATIONS

Machine-generated translation of CN 206122746, Xin-xue Wang, "A Decoration For Preventing Motor And Electric Drill Capable Of Measuring Depth", Apr. 26, 2017.*

(Continued)

*Primary Examiner* — Raymond Alejandro
(74) *Attorney, Agent, or Firm* — J-TEK LAW PLLC; Jeffrey D. Tekanic; Scott T. Wakeman

(57) ABSTRACT

A battery-powered portable tool includes: a battery pack containing at least one all-solid-state battery cell; a tool main body, on which and/or inside which the battery pack is mountable and from which the battery pack is demountable; and a plurality of components contained in the battery pack and/or in the tool main body. The plurality of components is disposed in a first layout or physical configuration when the temperature is low and is disposed in a second layout or physical configuration when the temperature is high. The first layout or physical configuration differs from the second layout or physical configuration.

20 Claims, 17 Drawing Sheets

Related U.S. Application Data

(60) Provisional application No. 63/014,882, filed on Apr. 24, 2020.

(51) Int. Cl.
| | |
|---|---|
| *H01M 10/48* | (2006.01) |
| *H01M 10/615* | (2014.01) |
| *H01M 10/6235* | (2014.01) |
| *H01M 50/247* | (2021.01) |
| *H01M 50/209* | (2021.01) |
| *H01M 50/271* | (2021.01) |
| *H01M 50/55* | (2021.01) |
| *H01M 50/553* | (2021.01) |
| *H01M 50/566* | (2021.01) |

(52) U.S. Cl.
CPC ..... *H01M 10/6235* (2015.04); *H01M 50/247* (2021.01); *H01M 50/209* (2021.01); *H01M 50/271* (2021.01); *H01M 50/55* (2021.01); *H01M 50/553* (2021.01); *H01M 50/566* (2021.01)

(58) Field of Classification Search
CPC ............. H01M 10/61; H01M 10/6235; H01M 10/443; H01M 50/247; H01M 50/209; H01M 50/55; H01M 50/553; H01M 50/271; H01M 50/566
See application file for complete search history.

(56) References Cited

U.S. PATENT DOCUMENTS

| | | | |
|---|---|---|---|
| 11,233,282 B2* | 1/2022 | Suzuki | H01M 10/4257 |
| 2006/0220620 A1 | 10/2006 | Aradachi et al. | |
| 2011/0050175 A1 | 3/2011 | Odaohhara et al. | |
| 2013/0189597 A1 | 7/2013 | Kim et al. | |
| 2014/0037535 A1 | 2/2014 | Miyashita | |
| 2014/0072930 A1 | 3/2014 | Pruckner et al. | |
| 2015/0194710 A1 | 7/2015 | Naito | |
| 2016/0156081 A1 | 6/2016 | Wang et al. | |
| 2016/0233563 A1 | 8/2016 | Oshima et al. | |
| 2016/0268647 A1 | 9/2016 | Umemura et al. | |
| 2016/0359343 A1 | 12/2016 | Ito et al. | |
| 2017/0049424 A1 | 2/2017 | Pruckner et al. | |
| 2018/0198294 A1 | 7/2018 | Sheeks et al. | |
| 2018/0233936 A1 | 8/2018 | Yamada et al. | |
| 2019/0123569 A1 | 4/2019 | Kobayakawa et al. | |
| 2019/0140311 A1* | 5/2019 | Hasegawa | H01M 50/574 |
| 2019/0252727 A1 | 8/2019 | Shimizu et al. | |
| 2019/0260070 A1 | 8/2019 | Kishimoto et al. | |
| 2020/0006753 A1 | 1/2020 | Nakajima et al. | |
| 2020/0020974 A1 | 1/2020 | Shimizu et al. | |
| 2020/0127340 A1 | 4/2020 | Krondorfer | |
| 2020/0350613 A1 | 11/2020 | Kato et al. | |
| 2021/0066771 A1 | 3/2021 | Shimura et al. | |

FOREIGN PATENT DOCUMENTS

| | | | |
|---|---|---|---|
| CN | 104779356 A | 7/2015 | |
| CN | 105637699 A | 6/2016 | |
| CN | 205544494 U | 8/2016 | |
| CN | 205609700 U | 9/2016 | |
| CN | 106239435 A | 12/2016 | |
| CN | 106463947 A | 2/2017 | |
| CN | 206122746 * | 4/2017 | ............ B23B 45/02 |
| CN | 106992565 A | 7/2017 | |
| CN | 206340629 U | 7/2017 | |
| CN | 206558619 U | 10/2017 | |
| CN | 107431237 A | 12/2017 | |
| CN | 108120936 A | 6/2018 | |
| CN | 108400395 A | 8/2018 | |
| CN | 108448189 A | 8/2018 | |
| CN | 109698532 A | 4/2019 | |
| EP | 2524667 A2 | 11/2012 | |
| EP | 2698856 A1 | 2/2014 | |
| EP | 3107180 A1 | 12/2016 | |
| EP | 3240097 A1 | 11/2017 | |
| EP | 3264517 A1 | 1/2018 | |
| EP | 3760386 A1 | 1/2021 | |
| JP | 2003092837 A | 3/2003 | |
| JP | 2006288150 A | 10/2006 | |
| JP | 2012209070 A | 10/2012 | |
| JP | 2012234749 A | 11/2012 | |
| JP | 2018029407 A | 2/2018 | |
| JP | 2018129986 A | 8/2018 | |
| JP | 2018160419 A | 10/2018 | |
| JP | 2019029317 A | 2/2019 | |
| JP | 2020021657 A | 2/2020 | |
| KR | 20000010558 U | 6/2000 | |
| KR | 20130085325 A | 7/2013 | |
| WO | 2016136507 A1 | 9/2016 | |
| WO | 2018092370 A1 | 5/2018 | |
| WO | 2018092484 A1 | 5/2018 | |

OTHER PUBLICATIONS

European Search Report from the European Patent Office dated Dec. 8, 2020 in related application No. EP 20 18 0042, including European Search Opinion and Examined claims 1-15.

Communication from the European Patent Office in counterpart EP application No. 20 180 042.2 dated Oct. 27, 2023, and examined claims 1-12.

Office Action and Search Report from the Chinese Patent Office dispatched Jan. 12, 2024 in counterpart application No. 202010546051. X, and translation thereof.

Liu Bing-jun et al., "Engine Starting Auxiliary Device for Battery Heating of Medium & Heavy Duty Vehicles in Plateau and Cold Area", Equipment Environmental Engineering, 2017, and translation thereof.

* cited by examiner

BATTERY-POWERED PORTABLE TOOL

CROSS-REFERENCE TO RELATED APPLICATIONS

This application is a divisional application of U.S. application Ser. No. 16/884,322, now U.S. Pat. No. 11,233,282, which claims priority to Japanese patent application no. 2019-111774 filed on Jun. 17, 2019, and to U.S. patent application No. 63/014,882 filed on Apr. 24, 2020, the contents of both of which are incorporated herein by reference.

TECHNICAL FIELD

The present specification discloses techniques relating to battery-powered (cordless) portable tools, including without limitation, cordless power tools that are used while being supported (e.g., hand-held) by a user, such as a battery-powered drill, a battery-powered screw-fastening machine (driver), a battery-powered chain saw, a battery-powered circular saw, a battery-powered hand-held vacuum cleaner (dust extractor), a battery-powered illuminator (flashlight), etc., although at least some aspects of the present teachings are also equally applicable to battery-powered portable tools that are carried by a user and then are used while being disposed or placed on a surface (e.g., a benchtop, a work stand, a floor, the ground, etc.), including without limitation, a battery-powered miter saw, a battery-powered table saw, a battery-powered lawn mower, a battery-powered ground-supported vacuum cleaner (dust extractor), etc. The present specification also discloses techniques relating to a battery pack containing one or more all-solid-state battery cells that is mountable on and demountable from a tool main body of any of the above- or below-mentioned cordless portable tools.

BACKGROUND ART

Battery-powered (cordless) portable tools have become prevalent owing to their convenience and capability of being used in a wide variety of work environments. In the past, such battery-powered portable tools have been driven by rechargeable batteries based upon nickel-cadmium, nickel metal hydride and lithium ion battery chemistries.

With regard to batteries that have been used in the past to power battery-powered portable tools, because it is preferable that the electric energy storage capacity per unit of weight or volume (i.e. energy storage density in terms of mass or volume), and/or the electric output capacity (rated output) per unit of weight or volume, be large, usage of lithium-ion batteries has greatly increased in recent years. In lithium-ion batteries, an electrolytic fluid or gel is filled between a positive electrode and a negative electrode, and, during charging and discharging, lithium ions move between the positive electrode and the negative electrode via the electrolytic fluid or gel.

SUMMARY OF THE INVENTION

Owing to the fact that lithium-ion batteries utilize an electrolytic fluid (liquid) or gel (viscous liquid), lithium-ion batteries do not operate satisfactorily in a low-temperature environment, such as an environment in which the electrolytic fluid freezes. In fact, as the temperature of the electrolytic fluid decreases, the internal resistance of the battery increases, whereby the battery output decreases. Consequently, a portable tool powered by a lithium-ion battery may become unusable even in a temperature environment in which the temperature is not so low that the electrolytic fluid freezes. On the other hand, if the temperature of the electrolytic fluid or gel becomes too high, then the internal pressure within the battery cell(s) rises excessively owing to gas emanating (gas generation) within the electrolytic fluid, which might cause the battery cell(s) to fail. Therefore, in a portable tool powered by a lithium-ion battery, it is necessary to control (limit, restrict) the battery output in high-temperature situations so that the battery does not overheat. Thus, a portable tool powered by a lithium-ion battery may also become unusable in a high-temperature environment.

Because such known battery-powered portable tools may become unusable both in a low-temperature environment (in which the internal resistance of the battery may increase in a detrimental manner) and also in a high-temperature environment (in which the internal pressure of the battery cell(s) may become excessively high), it is one non-limiting object of the present teachings to disclose techniques for expanding the usable temperature range of battery-powered portable tools.

In addition or in the alternative, it is noted that the maximum output of battery-powered (cordless) portable tools may fluctuate greatly in accordance with the ambient temperature. That is, it is possible to design a battery-powered portable tool so as to achieve a sufficient maximum output in high-temperature environments; but, such a design may result in a reduced (and possibly, insufficient) maximum output in low temperature environments, which has the effect of reducing working efficiency in low temperature environments. In known battery-powered portable tools, the range of variation of the maximum output due to temperature changes may be disadvantageously large. Therefore, in addition or in the alternative to the above-mentioned object, it is another non-limiting object of the present teachings to disclose techniques for decreasing the range of variation in the maximum output of a battery-powered portable tool due to (caused by) temperature changes.

In addition, it is noted that, to widen the usable temperature range of a battery-powered portable tool, a temperature measurement technique is needed to broaden the accurately measurable temperature range. Therefore, in addition or in the alternative to the above-mentioned objects, it is another non-limiting object of the present teachings to disclose techniques for expanding the accurately measurable temperature range by using an improved temperature-measurement circuit that is installed in the battery-powered portable tool and/or in the battery pack that supplies power to the portable tool.

It is further noted that, if a battery (battery chemistry) is utilized that has suitable low temperature operation properties, the required electric power can be sufficiently obtained from the battery in a low temperature environment. However, in this case, it is possible that the temperature of the electronic device powered by such a battery would be too low for the electronic device to operate normally. To address this problem, the present teachings also provide techniques for warming electronic devices (e.g., one or more components of the battery-powered portable tool), which do not operate normally in low temperature environments, to a temperature range in which the electronic devices will operate normally. It is also noted that, such a battery-powered portable tool might be used in a high temperature environment. In this case, a battery-powered portable tool may require a heat-dissipating apparatus to cool one or more electrical devices (e.g., one or more components of the battery-powered portable tool) that may need to be cooled in a high-temperature environment in order to operate in a suitable manner (e.g., to reduce the risk of premature failure caused by overheating). The present teachings therefore also provide techniques for warming one or more electrical devices to a temperature range in which the electrical device(s) operate(s) normally and/or optimally, as well as techniques for dissipating heat from one or more electrical devices (e.g., that same electrical device(s) that is/are warmed and/or one or more different electrical devices) so that the temperature of heat-sensitive electrical devices does not become abnormally or excessively high. The warming techniques and the heat-dissipating techniques disclosed herein may be utilized individually, or both warming and heat-dissipating techniques may be implemented in the same battery-powered portable tool in a compatible (non-interfering) manner.

In another aspect of the present teachings, an all-solid-state battery, which does not use an electrolytic fluid or gel (but rather is constructed with a solid electrolyte or conductive material between positive and negative electrodes), is utilized to power the battery-powered portable tool, because such batteries have a wider usable temperature range owing to the fact that the electrolyte or conductive material is solid in all temperature environments in which the tool is likely to be used. In addition, all-solid-state batteries also make it possible to reduce the wiring inductance inside the battery pack, as compared to other battery chemistries, thanks to the construction of the all-solid-state battery. To make use of this advantage, it is necessary to also design the electrical circuits in the power tool such that the wiring inductance inside the power tool main body, on which the battery pack is mountable and from which it is demountable, is low. Therefore, the present specification also discloses techniques for achieving a low (lower) wiring inductance inside the power tool main body.

All-solid-state batteries, which do not use an electrolytic fluid or gel, provide the additional advantage that charging can be performed safely (i.e. without risking permanent damage to the battery cell(s)) using a larger electric current than can be used, e.g., in a lithium-ion battery. Furthermore, such an all-solid-state battery can be recharged during operation of the portable power tool by using regenerated electric current (power) that is generated when a tool bit or other tool accessory is being braked, i.e. motor of a tool operates as a generator that outputs current for recharging the all-solid state battery cell(s). Therefore, the present teachings provide techniques for recharging an all-solid-state battery during operation of the portable power tool by using regenerated electric power without damaging the battery.

As was mentioned above, known battery packs comprising one or more battery cells having an electrolytic fluid or gel (liquid electrolyte) require cooling in high temperature environments or usage, in order to prevent damage to the battery cell(s) caused by overheating. Therefore, a cooling air passage must be provided within known battery packs, which leads to the battery pack housing having a complicated internal shape so that the battery pack becomes relatively heavy and bulky. On the other hand, a battery pack comprising one or more all-solid-state battery cells according to the present teachings does not need a cooling air passage within the battery pack. As a result, the weight and size of a battery pack comprising all-solid-state batteries according to the present teachings can be reduced, so that a lighter and more compact battery pack can be realized, as compared to a battery pack having the same capacity (e.g., as measured either in "ampere hours", also written as A·h or simply Ah, or in "watt hours", also written as W·h or simply Wh) that utilizes a battery chemistry having an electrolytic fluid or gel, such as battery packs containing lithium ion battery cells. For example, by using all-solid-state batteries and battery pack housings in accordance with the present teachings, an electric energy storage capacity per unit of battery pack weight of 200 Wh/kg or more, which was impossible with known battery chemistries that utilize liquid or gel electrolytes, becomes possible. Such a high electric energy storage capacity per kilogram of battery pack weight (i.e. a high energy storage density) facilitates the design of power tool systems that can substantially reduce user fatigue, as will be further explained below. Herein, "Wh" is an abbreviation of the unit of energy known as "Watt-hours", which also may be represented as "W·h". One Watt-hour equals 3600 Joules.

In some known battery-powered portable power tools (power tool systems), the battery pack is attached to a belt worn around the user's waist (or to another article of clothing worn by the user, such as a shoulder harness) such that the battery pack is not directly mounted (attached) to the main body of the power tool that is held by the user. In this type of battery-powered portable power tool, the battery pack on the user's waist is electrically connected to the main body of the power tool held by the user's hand via an electric cable (power cord). Because the overall weight of the power tool system (which is manually held by the user) is reduced (owing to the fact that the user does not have to manually support the weight of the battery pack during operation), user fatigue can be reduced. For example, as shown in Japanese laid open patent publication no. 2018-129986 (and its counterpart US 2018/0233936) or Japanese laid open patent publication no. 2020-21657, the electric cable is connected to the main body of the power tool via a connector that has a weight of about 250 g. However, in embodiments of the present teachings in which the energy storage density of the battery pack is 200 Wh/kg or more, a battery pack having an electric storage capacity of 50 Wh or more may be designed so as to have a battery pack weight (e.g., about 250 g or less) that is lighter than the connector (250 g). Because most types of work performed using battery-powered portable power tools may be completed by consuming 50 Wh or less, battery packs according to the present teachings make it possible to eliminate the need to attach the battery pack to the waist of the user without increasing the weight of the power tool system overall so that user fatigue still remains low.

In another non-limiting aspect of the present teachings, it is possible to increase the electric energy storage capacity per unit of the battery pack volume (i.e. energy storage density in terms of volume, i.e. liters) to 300 Wh/l or more, which again was not possible with known battery chemistries that utilize liquid or gel electrolytes. Because such a high electric energy storage capacity per unit volume can be achieved according to the present teachings, the volume of a battery pack that is capable of storing 50 Wh or more of energy can be downsized (reduced) to a volume of less than 170 ml, thereby facilitating power tool designs in which the battery (battery pack) is installed (inserted) within a grip (handle) of the battery-powered portable power tool.

In another non-limiting aspect of the present teachings, it is noted that all-solid-state battery cells do not need cooling while charging and discharging. Therefore, because a battery pack comprising (containing) all-solid-state battery cells does not need a cooling air passage within the battery pack, the housing of the battery pack can be designed such that the battery cell(s) are completely shielded (sealed, preferably in a water-proof manner) from the atmosphere. If the battery cell(s) is (are) completely protected (sealed) from water, rain, dust, etc., the weatherability (i.e. the ability to endure or resist exposure to inclement weather, harsh or dusty operating conditions, etc., without degradation) of the battery pack, and the battery cells in particular, can be increased. The present teachings, in this aspect, facilitate improvements in the lightness, compactness and/or weatherability of battery packs, e.g., for use with battery-powered portable power tools, which may be particularly advantageous when used in hand-held or manually-operated outdoor power equipment, such as, e.g., blowers, mowers, chain saws, string trimmers, hedge clippers, etc.

In a first non-limiting embodiment disclosed in the present specification, the usable temperature range of a battery-powered portable tool is expanded. To implement such an embodiment, the temperature range, which is (accurately) measurable using a battery temperature-measurement circuit installed in such a battery-powered portable tool, is widened.

For example, a battery-powered portable tool according to the first embodiment includes a battery temperature-measurement circuit that may be contained within the tool main body (housing) and/or within the battery pack. The battery temperature-measurement circuit preferably comprises: a high-temperature measurement circuit that outputs accurate measurement results in a high-temperature range but outputs less accurate measurement results in a low-temperature range; and a low-temperature measurement circuit that outputs accurate measurement results in the low-temperature range but outputs less accurate measurement results in the high-temperature range. In one exemplary embodiment, a single or common battery temperature-measurement circuit may comprise the high-temperature measurement circuit and the low-temperature measurement circuit; an output, which is used to determine the temperature of the battery cell(s), of the single or common battery temperature-measurement circuit may be shifted or selected between the output of the high-temperature measurement circuit and the output of the low-temperature measurement circuit by selecting or shifting (e.g., actuating/de-actuating or otherwise changing the state of) one or more switches or switching apparatus(es) within the single or common battery temperature-measurement circuit. For example, the battery temperature-measurement circuit may be adapted/configured to output the output of the low-temperature measurement circuit when the output value of the high-temperature measurement circuit enters a first abnormal range and to output the output of the high-temperature measurement circuit when the output value of the low-temperature measurement circuit enters a second abnormal range, which optionally may differ from the first abnormal range or may partially overlap. That is, the battery temperature-measurement circuit selects the output for determining the battery (battery cell(s)) temperature based on (or from) (i) the output of the low-temperature measurement circuit when the output value of the high-temperature measurement circuit enters the abnormal range and (ii) the output of the high-temperature measurement circuit when the output value of the low-temperature measurement circuit enters the abnormal range. In one exemplary embodiment, the battery temperature-measurement circuit may be adapted/configured to determine the battery (battery cell(s)) temperature based upon the selected output. In another exemplary embodiment, a different circuit, such as a controller or microprocessor, may be adapted/configured to determine the battery (battery cell(s)) temperature based upon the selected output from the battery temperature-measurement circuit.

Herein, the term "abnormal range(s)" mean(s) a range or ranges in which measurement results are deemed to be inaccurate or unreliable for use in determining how to operate the tool and/or the battery pack. For example, in the case of the high-temperature measurement circuit described below with reference to FIG. 4, when the output voltage of the temperature-measurement circuit (microcontroller read-in voltage) is in the range of 1.8-4.0 V, there is a linear relationship between the output voltage and the thermistor temperature, and thus the accuracy of the temperature calculated based on the output voltage is high. In contrast, when the output voltage is 1.8 V or less or 4.0 V or more, the above-mentioned linear relationship is not obtained, and thus the temperature calculated based on the output voltage tends to become inaccurate and/or unreliable. In the case of the example described in further detail below, the abnormal ranges of the temperature-measurement circuit are defined as 1.8 V or less and 4.0 V or more.

In battery-powered portable tools and/or battery packs according to the first embodiment, it becomes possible to efficiently make use of an all-solid-state battery (i.e. containing one or more all-solid-state battery cells) that is usable over a wide temperature range, and thereby a battery-powered portable tool that is usable over a wider temperature range can be implemented.

In some embodiments of the present teachings, the battery-powered portable tool may include a battery or battery pack that is housed inside a tool main body, i.e. the battery cell(s) is (are) usually (except in an unusual situation, such as repair or overhaul of the power tool) contained within a housing of the portable tool. In such embodiments, the present teachings can be applied to a battery temperature-measurement circuit that is built into (disposed within) the housing of the portable tool. Alternately, a battery or battery pack may be mountable on and demountable from a battery mount part provided on the tool main body (tool housing). In the case of the latter, the present teachings can be applied to a battery temperature-measurement circuit that is completed by mounting the battery pack on the tool main body. However, it is also noted that the present teachings can be applied to a battery temperature-measurement circuit that is built into (disposed entirely within) the battery pack and also can be applied to a battery temperature-measurement circuit that is built into (disposed entirely within) the tool main body.

In addition, it is noted that the terms "battery" and "battery pack" are generally used interchangeably in the present specification, unless otherwise specified, and thus the present teachings are not limited to either a battery pack (or battery cartridge) or to a battery cell or battery cells.

DETAILED DESCRIPTION OF EMBODIMENTS OF THE PRESENT TEACHINGS

Figure 1:
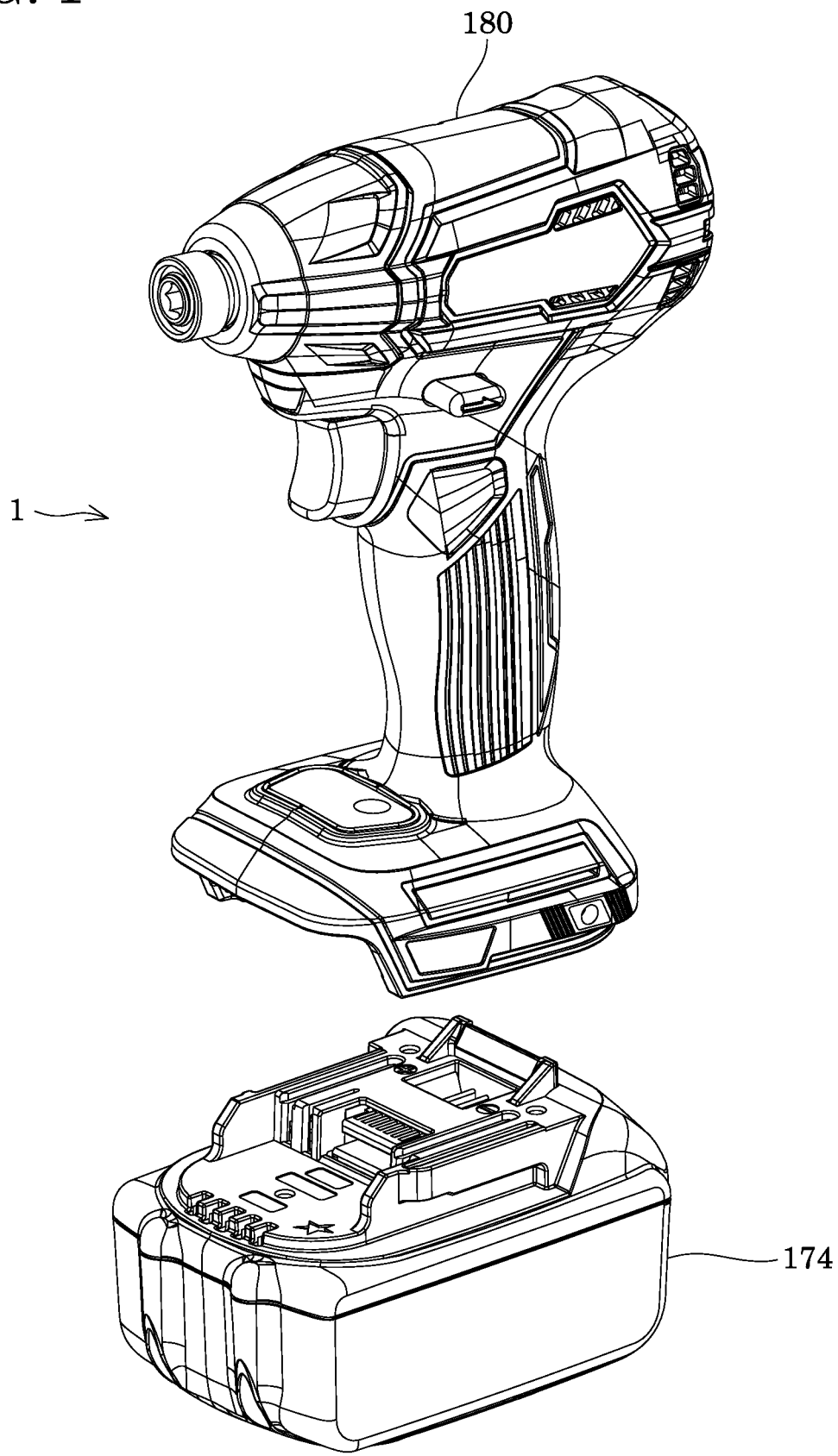
FIG. 1 shows one representative, non-limiting example of a battery pack that uses all-solid-state battery cells and one example of a tool main body according to the present teachings.

Non-limiting aspects of the working examples explained below will be enumerated before providing a description of detailed embodiments of the present teachings.

(Aspect 1) A battery-powered portable tool that is configured/adapted to be, used, e.g., in the state in which it is supported (e.g., held) by a user or in the state in which it is used by the user at a stationary location (e.g., a position, to which the user carried and placed the portable tool prior to initiating operation of the portable tool), comprising:

a battery pack containing an all-solid-state battery (e.g., at least one all-solid-state battery cell);

a tool main body (housing), on which and/or inside which the battery pack is mountable and from which the battery pack is demountable; and an actuator adapted/configured to operate using electric power supplied by the battery pack, the actuator being contained within the interior of the tool main body and being electrically connected or connectable to the all-solid-state battery.

As used herein, the expression "on which and/or inside which" is meant to encompass (unless otherwise stated) embodiments in which: (i) the battery pack is mounted on (i.e. the embodiment encompassed by "on which") an external surface of the tool main body (or the handle or grip thereof) such that the housing of the battery pack is substantially exposed externally (e.g., only a battery mounting part (e.g., containing electrical terminals and engaging rails) is not exposed externally because it faces or opposes a corresponding battery mounting part defined on an exterior surface of the tool main body (or the handle or grip thereof)), (ii) the battery pack is disposed entirely inside (i.e. the embodiment encompassed by "inside which") the tool main body (or a handle or grip thereof), such that the tool main body (or the handle or grip thereof) entirely surrounds the battery pack, and (iii) the battery pack is partially disposed (i.e. the embodiment encompassed by "on and inside which") within the tool main body (or the handle or grip thereof) and is partially exposed exterior to the tool main body (or the handle or grip thereof).

Furthermore, the expression "on which and/or inside which" should be understood as individually describing three distinct embodiments, which may be claimed individually (e.g., only "on which", only "inside which" or "on and inside which" (i.e. partially)) or in groups of two (e.g., "on which" and "inside which", or "on which" and "on and inside which" or "on and inside which" and "inside which"), or all three (i.e. "on which", "inside which" and "on and inside which").

Unlike other battery chemistries, an all-solid-state battery is not constrained by being unusable in a low-temperature environment in which an electrolytic fluid or gel might freeze and also is not constrained by being unusable in a high-temperature environment in which the pressure of gas emanating within the electrolytic fluid or gel might excessively rise and possibly cause permanent damage. Therefore, by using an all-solid-state battery to power (drive) the actuator of the portable tool, the usable temperature range of a battery-powered portable tool is greatly widened.

Herein, the term "all-solid-state battery" includes batteries in which an electrolytic fluid or gel (liquid electrolyte), e.g., of a lithium-ion battery, has been replaced with a solid body (e.g., a material that is a solid at all temperatures that the power tool might be operated, such as in the range of −40° C. to +60° C.). In addition or in the alternative, the term "all-solid-state battery cell" is intended to mean that all components of the battery cell, in particular the positive and negative electrodes and the material (e.g., electrolyte, semiconductor, etc.) within the battery cell that electrically connects the positive and negative electrodes, are in the solid state (i.e. the solid fundamental state of matter) at a temperature of 25° C. and/or a temperature of 50° C. and/or a temperature of 100° C. and/or a temperature of 125° C. and/or any temperature in a range of −30° C. to 125° C.

Representative, non-limiting "all-solid-state batteries" that may be used in the present teachings are disclosed, e.g., in WO 2018/092370 (and its counterpart US 2019/0252727), WO 2018/092484 (and its counterpart US 2019/0260070), and Japanese laid open patent publication no. 2019-29317 (and its counterpart US 2020/0006753), all of which are incorporated herein by reference as if fully set forth herein. However, it is noted that Japanese laid open patent publication No. 2019-29317 (and its counterpart US 2020/0006753) discloses three types of batteries respectively containing an electrolytic fluid, an electrolytic gel and an electrolytic solid. It is intended that the battery containing the electrolytic solid of Japanese laid open patent publication No. 2019-29317 (and its counterpart US 2020/0006753) is to be used with embodiments disclosed herein.

Furthermore, it is noted that "all-solid-state batteries" that do not use any electrolytic material are also available. For example and without limitation, an all-solid-state battery according to the present teachings also may be configured/formed as a layered (stack) structure, wherein an ITO substrate is configured as a positive (cathode) electrode, a p-type semiconductor layer is formed thereon, an insulation layer is formed thereon, an n-type semiconductor layer is formed thereon, and a negative (anode) electrode is formed thereon. Thus, a battery that uses (has) such a layered structure is another type of all-solid-state battery that may be used with the present teachings. In addition, an all-solid-state battery according to the present teachings may be an all-solid-state semiconductor battery. In the present Aspects and in the working examples described below, an all-solid-state battery is used in which the cycle of charging and discharging can be performed repeatedly, i.e. rechargeable (secondary) all-solid-state batteries are preferably used with the present teachings.

In all Aspects, embodiments and claims of the present teachings, unless explicitly indicated otherwise, the above-mentioned actuator of the power tool is not limited to a motor or the like, i.e. an electronic device that converts the electric power supplied by the battery pack into motion (e.g. rotation and/or linear actuation). The actuator may also be designed to convert electric current into heat (e.g., a resistive heater or Peltier element), cooling (e.g., the Peltier element), light (e.g., an LED), sound (e.g., a speaker), radio waves, or the like.

(Aspect 2) A battery-powered portable tool comprising:
a battery pack;
a tool main body, on which and/or inside which the battery pack is mountable and from which the battery pack is demountable; and
an actuator adapted/configured to operate using electric power supplied by the battery pack, the actuator being contained in the interior of the tool main body;
wherein the following relationship is satisfied:

(maximum output of the actuator at $-20°$ C.)/(maximum output of the actuator at $+50°$ C.)$>0.5$.

In actuality, it is often the case that work in a low-temperature-environment can be carried out as long as a maximum output of half or more of the maximum rated output, e.g., at $+50°$ C. can be ensured even in a low-temperature environment, e.g., of $-20°$ C. In this case, the usable temperature range of the battery-powered portable tool is widened.

As was described above, it is preferable that the battery pack has an electric energy storage capacity per unit of the battery pack weight of 200 Wh/kg or more, and/or an electric energy storage capacity per unit of the battery pack volume of 300 Wh/l or more. By using such an all-solid-state battery, it is possible to obtain not only the above electric energy storage capacity but also the above-mentioned relationship of (maximum output of the actuator at $-20°$ C.)/(maximum output of the actuator at $+50°$ C.)$>0.5$. In embodiments in which the battery pack satisfies all of the above-mentioned features, a wide range of operation in cold environments can be performed by the portable tool that is driven (powered) by such all-solid-state batteries.

It is also preferable that either the housing of the battery pack or a sub-housing (internal enclosure) contained within the housing of the battery pack is adapted/configured to shield (seal, e.g., waterproof seal) the battery cell(s) in the battery pack from the atmosphere and/or outside environment. Because all-solid-state battery cells can be used at high temperatures without overheating, they do not need cooling. Consequently, all-solid-state battery cells can be entirely shielded or sealed from the atmosphere (external environment) and thereby protected from water, rain, dust, metal shards, etc. In other words, the ingress of foreign matter into the battery cells, in particular into the vicinity of and/or into contact with the positive and negative electrodes of the battery cells, can be completely blocked. By using such a battery pack, work can be safely performed, e.g., in inclement weather (e.g., rain, dust storm, etc.) or otherwise harsh conditions, without fear that the battery cells will electrically short or otherwise be damaged due to the ingress of foreign matter such as water or dust.

(Aspect 3) A battery-powered portable tool comprising:
a battery pack;
a tool main body, on which and/or inside which the battery pack is mountable and from which the battery pack is demountable; and
an actuator adapted/configured to operate with electric power supplied by the battery pack, the actuator being contained in the interior of the tool main body;
wherein the actuator operates with current supplied from the battery pack even if the ambient temperature is below the freezing point, as long as the ambient temperature is $-30°$ C. or higher.

If an all-solid-state battery is used, then the battery-powered portable tool remains usable even if the ambient temperature is below freezing point, as long as the ambient temperature is $-30°$ C. or higher.

In Aspect 3 as well, it is also preferable that the battery pack has an electric energy storage capacity per unit of battery pack weight of 200 Wh/kg or more, and/or an electric storage capacity per unit of battery pack volume of 300 Wh/l or more.

(Aspect 4) A battery-powered portable tool comprising:
a battery pack;
a tool main body, on which and/or inside which the battery pack is mountable and from which the battery pack is demountable; and
an actuator adapted/configured to operate with electric power supplied by the battery pack, the actuator being contained in the interior of the tool main body;
wherein the actuator operates with current supplied from the battery pack even if the ambient temperature is $+50°$ C. or higher, as long as the battery temperature is $+100°$ C. or lower.

In known battery-powered tools, it has been necessary to control (limit) the battery temperature (e.g., of lithium-ion battery cells) so that the battery temperature does not rise to $+80°$ C. or higher. However, if the ambient temperature becomes $+50°$ C. or higher, then various constraints come into play, which lead to a decrease in working efficiency. On the other hand, if an all-solid-state battery is used according to the present teachings, then the battery temperature is permitted to rise to approximately +100° C. or possibly higher, and therefore operation can continue even if the battery temperature becomes, e.g., +80° C. or higher. Consequently, the various constraints for preventing overheating of the battery become unnecessary in a portable tool powered by an all-solid-state battery according to the present teachings.

In Aspect 3 as well, it is also preferable that the battery pack has an electric energy storage capacity per unit of battery pack weight of 200 Wh/kg or more, and/or an electric energy storage capacity per unit of battery pack volume of 300 Wh/l or more.

(Aspect 5) A battery-powered portable tool comprising:
a battery pack containing at least one all-solid-state battery cell;
a tool main body, on which and/or inside which the battery pack is mountable and from which the battery pack is demountable; and
a battery temperature-measurement circuit contained inside the battery pack and/or inside the tool main body;
wherein the battery temperature-measurement circuit comprises a low temperature-measurement circuit and a high temperature-measurement circuit; and
the output of the low temperature-measurement circuit is utilized to determine the temperature of the at least one all-solid-state battery cell when the temperature (e.g., the battery temperature or the ambient temperature) is low (e.g., below a pre-determined temperature threshold), and the output of the high temperature-measurement circuit is utilized to determine the temperature of the at least one all-solid-state battery cell when the temperature (e.g., the battery temperature or the ambient temperature) is high (e.g., above a pre-determined temperature threshold).

The present technique can also be applied to the battery temperature-measurement circuit that is completed by mounting the battery pack on the tool main body (i.e. one portion of the battery temperature-measurement circuit is disposed in the battery pack and another portion of the battery temperature-measurement circuit is disposed in the tool main body), as long as the present technique can also be applied to the battery temperature-measurement circuit inside the battery pack and can also be applied to the battery temperature-measurement circuit inside the tool main body.

(Aspect 6) A battery-powered portable tool comprising:
a battery pack containing at least one all-solid-state battery cell;
a tool main body, on which and/or inside which the battery pack is mountable and from which the battery pack is demountable; and
a battery temperature-measurement circuit contained inside the battery pack and/or inside the tool main body;
wherein the battery temperature-measurement circuit comprises:
a high-temperature measurement circuit that on the one hand outputs accurate measurement results in a high-temperature range and on the other hand outputs less accurate measurement results in a low-temperature range (e.g., in a temperature range below a predetermined lower limit of the high-temperature range);
a low-temperature measurement circuit that on the one hand outputs accurate measurement results in the low-temperature range and on the other hand outputs less accurate measurement results in the high-temperature range (e.g., in a temperature range above a predetermined upper limit of the low-temperature range); and
a switching apparatus, which starts up (or selects the output of) the low-temperature measurement circuit when an output value of the high-temperature measurement circuit enters an abnormal range and starts up (or selects the output of) the high-temperature measurement circuit when an output value of the low-temperature measurement circuit enters an abnormal range.

The high-temperature measurement circuit has a prescribed temperature range in which the temperature can be measured accurately and, as long as the temperature (e.g., the battery temperature or the ambient temperature) is within that prescribed temperature range, the accuracy of the output value of the high-temperature measurement circuit is within a first prescribed accuracy range. Herein, the term "abnormal range(s)" means a range or ranges that is (are) outside of the prescribed temperature range. If the temperature (e.g., the battery temperature or the ambient temperature) is outside of the prescribed temperature range, then it is understood that the temperature (e.g., the battery temperature or the ambient temperature) is outside the range within which the high-temperature measurement circuit can accurately measure temperature. In this case, it is switched to the low-temperature measurement circuit so that the temperature measurements (e.g., of the battery or the ambient environment) will then be based upon the output of the low-temperature measurement circuit. Herein, the terms "accurate" and "accuracy" are intended to mean "the measured value is within +/−5° C. of the actual temperature", more preferably "the measured value is within +/−3° C. of the actual temperature".

Likewise, the low-temperature measurement circuit has a prescribed temperature range in which the temperature (e.g., the battery temperature or the ambient temperature) can be measured accurately, and, if the temperature is within that prescribed temperature range, then the accuracy of the output value of the low-temperature measurement circuit is within a second prescribed accuracy range (the first and second prescribed accuracy ranges may be the same or different in the low-temperature measurement circuit and the high-temperature measurement circuit). Similar to the above explanation, the term "abnormal range" means a range or ranges that is (are) outside of the prescribed temperature range of the low-temperature measurement circuit. If the temperature (e.g., the battery temperature or the ambient temperature) is outside of the prescribed temperature range, then it is understood that the temperature (e.g., the battery temperature or the ambient temperature) is outside of the range within which the low-temperature measurement circuit can accurately measure temperature. In this case, it is switched to the high-temperature measurement circuit so that the temperature measurements (e.g., of the battery or the ambient environment) will then be based upon the output of the high-temperature measurement circuit.

In the present Aspect, the required temperature can be measured with the required accuracy without using a high-cost temperature sensor that has a much wider measurement range.

The present Aspect includes the combined use of at least the high-temperature measurement circuit and the low-temperature measurement circuit, but does not exclude the additional provision of, for example, an intermediate-temperature measurement circuit. The technique of the combined use of the high-temperature measurement circuit and the low-temperature measurement circuit can also be applied to a battery temperature-measurement circuit that is completed by mounting the battery pack on the tool main body, as long as the technique can also be applied to the battery temperature-measurement circuit inside the battery pack and can be applied to the battery temperature-measurement circuit inside the tool main body.

(Aspect 7) The battery-powered tool according to the above Aspect 5 or 6, wherein:

the high-temperature measurement circuit comprises a series circuit in which a thermistor and a first voltage-divider resistor or resistance (combined resistance of two or more resistors) for high temperature are electrically connected in series; and the low-temperature measurement circuit comprises a series circuit in which the (same) thermistor and a second voltage-divider resistor or resistance (combined resistance of two or more resistors) for low temperature are electrically connected in series.

Thus, in the present Aspect, the required temperature can be measured with the required accuracy using one thermistor that is, e.g., shared by the high-temperature measurement circuit and the low-temperature measurement circuit.

(Aspect 8) The battery-powered tool according to the above Aspect 7, wherein the resistance value of the first voltage-divider resistor for high temperature is lower than the resistance value of the second voltage-divider resistor for low temperature. According to this Aspect, the voltage range output by the high-temperature measurement circuit may be substantially the same as, or may at least substantially overlap with, the voltage range output by the low-temperature measurement circuit. If the voltage range output by the high-temperature measurement circuit and the voltage range output by the low-temperature measurement circuit at least partially overlap, then a common (shared) output-voltage processing circuit can be utilized to process the voltages that are output by both the high-temperature measurement circuit and the low-temperature measurement circuit, thereby reducing the amount of circuitry necessary to implement this Aspect of the present teachings.

(Aspect 9) The battery-powered tool according to any one of the above Aspects 5 or 6 or 7 or 8, wherein the lower-limit temperature at which the high-temperature measurement circuit outputs accurate measurement results is higher than the upper-limit temperature at which the low-temperature measurement circuit outputs accurate measurement results.

For example, in an embodiment in which the required measurement range of the temperature-measurement circuit is −30° C. to +120° C., a temperature-measurement circuit that measures the range of −30° C. to +120° C. with high accuracy is either not available or would be excessively costly. Therefore, in the present Aspect, the measurement range can be split into two portions (ranges) by using: the low-temperature measurement circuit, in which the measurement range is set to −30° C. to approximately +45° C. (a measurement range of 75° C.), and the high-temperature measurement circuit, in which the measurement range is set to approximately +45° C. to +120° C. (a measurement range of 75° C.). Incidentally, in such a battery-powered tool, there are situations in which there is no need to measure the temperature in the temperature range of, for example, +20° C. to +60° C. (e.g., because there is little or no risk that battery operation will be impaired in this temperature range). Accordingly, in such an embodiment, the measurement range of the low-temperature measurement circuit can be narrowed, e.g., to −30° C. to +20° C. (a measurement range of 50° C.), and the measurement range of the high-temperature measurement circuit can be narrowed, e.g., to +60° C. to +120° C. (a measurement range of 60° C.). If the (each) measurement range is narrowed, then the measurement resolution can be made finer and the measurement accuracy can be increased. In the case of the above-mentioned example, there are situations in which, in the temperature range of +20° C. to +60° C., there is no need to specify to what degree the temperature is within that range, as long as it is known that the temperature is within the range. That is, it is not problematic even if an unmeasurable (or unmeasured) temperature range exists between the low and high measurement ranges of the low-temperature measurement circuit and the high-temperature measurement circuit, respectively.

(Aspect 10) A battery-powered portable tool comprising:

a battery pack containing at least one all-solid-state battery cell;

a tool main body, on which and/or inside which the battery pack is mountable and from which the battery pack is demountable; and a plurality of components contained in the battery pack and/or in the tool main body;

wherein the plurality of components is disposed (arranged) in a first layout (first physical configuration) when the temperature is low and is disposed (arranged) in a second layout (second physical configuration) when the temperature is high, the second layout differing from the first layout.

The technique of switching between the first layout and the second layout can also be applied to a component group that is obtained by mounting the battery pack on the tool main body, as long as it can also be applied to a component group in the battery pack and can also be applied to a component group inside the tool main body. The plurality of components is preferably designed to automatically switch from the first layout to the second layout and vice versa in accordance with a temperature change, e.g., mediated by a bimetal or bimetal strip or by an actuator controlled by a (the) temperature-measurement circuit, optionally via a controller or microprocessor. For example, the temperature change may be a pre-set value that is, e.g., determined by the material properties of the bimetal or bimetal strip, or a pre-set value that is, e.g., programmed or configured in the temperature-measurement circuit or the controller (e.g., microprocessor). The preset temperature value for automatically switching from the first layout to the second layout and vice versa may be, e.g., selected from any temperature within a range of −5 to +50° C.

(Aspect 11) A battery-powered portable tool comprising:

a battery pack containing at least one all-solid-state battery cell;

a tool main body, on which and/or inside which the battery pack is mountable and from which the battery pack is demountable;

a warming-required component, which requires warming when the temperature is low (e.g., less than 5° C., or less than 0° C., or less than −5° C., etc.), a heat-dissipation-required component, which requires heat dissipation when the temperature is high (e.g., greater than 50° C., or greater than 60° C., or greater than 70° C., etc.), a heater configured to warm the warming-required component;

a substrate, on which one or more of the warming-required component, the heat-dissipation-required component, and the heater are mounted;

a heat-dissipating member; and a bimetal (e.g., a bimetal strip);

wherein the bimetal has the property of changing its shape between a first configuration and a second configuration dependent on the temperature, the heat-dissipation-required component, the heat-dissipating member and the bimetal are configured such that the heat-dissipation-required component and the heat-dissipating member are in a noncontacting state in the first configuration of the bimetal when the temperature is low (e.g., less than 5° C., or less than 0° C., or less than −5° C., etc.), and the heat-dissipation-required component, the heat-dissipating member and the bimetal are configured such that the heat-dissipation-required component and the heat-dissipating member are brought into contact in the second configuration of the bimetal when the temperature is high (e.g., greater than 50° C., or greater than 60° C., or greater than 70° C., etc.), The heat-dissipation-required component and the heat-dissipating member are brought into contact and heat is dissipated from the heat-dissipation-required component when the temperature is high. On the other hand, the heat-dissipation-required component and the heat-dissipating member are in a noncontacting state when the temperature is low. Therefore, in the present Aspect, the heat of the heater is prevented or inhibited from being dissipated by the heat-dissipating member via the substrate and the heat-dissipation-required component when the temperature is low and thus the heat of the heater is efficiently transferred to the warming-required component.

The present technique (Aspect) can be applied to the tool main body and/or to the battery pack. That is, the warming-required component, the heat-dissipation-required component, the heater, the substrate, the heat-dissipating member and the bimetal may be disposed within the battery pack or within the tool main body (housing). In other embodiment, both of the battery pack and the tool main body may contain a warming-required component, a heat-dissipation-required component, a heater, a substrate, a heat-dissipating member and a bimetal according to the present Aspect, so that components within both the battery pack and the tool main body may be automatically warmed, if necessary, when the battery-powered portable tool is utilized in a low temperature environment.

(Aspect 12) The battery-powered tool according to the above Aspect 11, wherein the bimetal changes shape (e.g., the bimetal possesses the property of undergoing at least a one-dimensional shape change) such that it switches between the contact state and the noncontacting state at a boundary temperature (or within a boundary temperature range) between a state in which heat dissipation of the heat-dissipation-required component is not required and a state in which heat dissipation of the heat-dissipation-required component is required. The boundary temperature (or boundary temperature range) may be a temperature (or a range of temperatures) in the range, e.g., of 50-70° C. If a boundary temperature range is utilized, the lower limit of the temperature range may be, e.g., 50° C., 52° C., 54° C., 56° C., and 58° C. and the upper limit of the temperature range may be, e.g., 70° C., 68° C., 66° C., 64° C., 62° C. and 60° C., and the range may be defined by any one of the lower and upper limits in any combination that results in a range of temperatures between the lower limit and the upper limit.

(Aspect 13) The battery-powered tool according to the above Aspect 11, wherein the bimetal changes shape (e.g., the bimetal possesses the property of undergoing at least a one-dimensional shape change) such that it switches between the contact state and the noncontacting state at a (the) boundary temperature (or a (the) boundary temperature range) between a state in which warming of the warming-required component is not required and a state in which warming of the warming-required component is required. In this Aspect as well, the boundary temperature may be a temperature (or temperatures) in the range, e.g., of −5 to 5° C. If a boundary temperature range is utilized, the lower limit of the temperature range may be, e.g., −5° C., −4° C., −3° C., −2° C., and −1° C. and the upper limit of the temperature range may be, e.g., 5° C., 4° C., 3° C., 2° C., 1° C. and 0° C., and the range may be defined by any one of the lower and upper limits in any combination that results in a range of temperatures between the lower limit and the upper limit.

(Aspect 14) A battery-powered portable tool comprising:

a battery pack containing at least one all-solid-state battery cell;

a tool main body, on which and/or inside which the battery pack is mountable and from which the battery pack is demountable; and a warming-required component, which requires warming when the temperature is low, a heat-dissipation-required component, which requires heat dissipation when the temperature is high, and a heater, which heats the warming-required component, wherein the thermal resistance between the warming-required component and the heater is lower than the thermal resistance between the heat-dissipation-required component and the heater.

Only the battery pack or the tool main body may contain the warming-required component, the heat-dissipation-required component and the heater.

If the amount of heat transferred from the heater to the warming-required component is greater than or equal to the amount of heat transferred from the heater to the heat-dissipation-required component, then the warming-required component can be warmed efficiently and the time required to warm the warming-required component to the temperature at which the warming-required component operates normally can be shortened.

(Aspect 15) A battery-powered portable tool comprising:

a battery pack containing at least one all-solid-state battery cell;

a tool main body, on which and/or inside which the battery pack is mountable and from which the battery pack is demountable; and a warming-required component, which requires warming when the temperature is low, a heat-dissipation-required component, which requires heat dissipation when the temperature is high, and a heater, which warms the warming-required component wherein the thermal resistance between the warming-required component and the heater is lower than the thermal resistance between the warming-required component and the heat-dissipation-required component.

Only the battery pack or the tool main body may contain the warming-required component, the heat-dissipation-required component and the heater.

In the present Aspect, heat transferred from the heater to the warming-required component tends not to be or is inhibited from being transferred from the warming-required component to the heat-dissipation-required component. Therefore, the warming-required component can be warmed efficiently, and the time required to warm the warming-required component to the temperature at which it operates normally can be shortened.

(Aspect 16) The battery-powered tool according to the above Aspect 14 or 15, wherein at least the warming-required component, the heater, and the portion of a substrate, which is interposed between the warming-required component and the heater, are covered by a solid isolating (insulating) material that isolates (insulates) such components from the surrounding atmosphere.

In the present Aspect, dissipation of heat from the heater, from the warming-required component, and from the portion of the substrate interposed between the warming-required component and the heater, to the atmosphere is reduced by the isolating (insulating) material.

(Aspect 17) A battery-powered portable tool comprising: a warming apparatus configured to warm an electronic component within the tool when normal operation of the electronic component is not guaranteed due to the tool being used in a low temperature environment (e.g., less than 5° C., or less than 0° C., or less than −5° C., etc.).

(Aspect 18) A battery-powered portable tool, wherein an all-solid-state battery is housed inside a tool main body.

(Aspect 19) A battery-powered portable tool comprising:
a battery pack containing at least one all-solid-state battery cell; and
a tool main body, on which and/or inside which the battery pack is mountable and from which the battery pack is demountable.

The battery pack has an electric energy storage capacity of 200 Wh/kg (with respect to the weight of the battery pack) or more and/or 300 Wh/l or more (with respect to the volume of the battery pack), and all-solid-state battery cell(s) is (are) shielded and/or sealed (e.g., hermetically sealed) from the atmosphere (external environment) by a housing. In one embodiment, the housing may be an external housing that, e.g., also has battery terminals and at least one communication terminal disposed on an external surface of the external housing. In another embodiment, the housing may be an internal housing that is at least partially, or possibly entirely, disposed within the external housing. As used herein as well as in any other Aspect or claim of the present teachings, unless otherwise stated, the terms "shielded" and "sealed" mean an at least water-proof seal and a dust-proof seal (e.g. particles and molecules less than a predetermined size of, e.g., 5 nm, 2 nm, 1 nm, 8 Å, 6 Å or 5 Å, are blocked from passing or permeating through the seal or shield from the atmosphere into an interior chamber holding the all-solid-state battery cell(s)). Thus, in some embodiments of the present teachings, gas exchange is permissible between an interior chamber holding the all-solid-state battery cell(s) and the atmosphere or external environment, but moisture and debris can not pass through. However, in other embodiments, the shielding or seal may also be gas impermeable, in addition to water impermeable and debris impermeable. It is noted that the seal or shield may include a portion having a pore or pores (gap(s)) that are large enough for water to pass through, but the pore(s) or gap(s) are coated with a non-polar or hydrophobic material, e.g., fluorinated polymers such as polytetrafluoroethylene, that causes water to have a high contact angle (e.g., 90° or greater at 25° C., more preferably 100° or greater, more preferably 115° or greater, even more preferably 125° or greater), which results in the fact that water droplets on the surface of the pore(s) or gap(s) become too big to pass through the pore(s) or gap(s).

(Aspect 20) A battery-powered portable tool comprising:
a battery pack containing at least one all-solid-state battery cell; and
a tool main body, on which and/or inside which the battery pack is mountable and from which the battery pack is demountable; wherein,
the tool main body comprises: a positive terminal, which contacts (or is adapted/configured to contact) a positive electrode of the battery pack when the battery pack is mounted on the tool main body; a negative terminal, which contacts (or is adapted/configured to contact) a negative electrode of the battery pack when the battery pack is mounted on the tool main body; a first wiring (or first wire), which is electrically connected to and extends from the positive terminal; a second wiring (or second wire), which is electrically connected to and extends from the negative terminal; and a control device, which is electrically connected to the first wiring and the second wiring; and
the first wiring and the second wiring extend in parallel in the state in which they are electrically insulated from one another.

(Aspect 21) A battery-powered portable tool comprising:
a battery pack containing at least one all-solid-state battery cell;
a tool main body, on which and/or inside which the battery pack is mountable and from which the battery pack is demountable; and
a motor housed in the tool main body;
wherein the battery pack is configured/adapted to output, to the tool main body, an electrical signal that indicates whether or not the battery pack is in a state that permits charging of the battery pack using regenerated electric power generated by the motor.

In one embodiment of this Aspect, the battery pack may further comprise a battery-condition determination circuit, such as, e.g., a controller (e.g., a microprocessor), that is adapted/configured/programmed to: (i) assess the condition of the at least one all-solid-state battery cell and (ii) generate the electrical signal based on the assessed condition.

(Aspect 22) A battery pack that is mountable on (and/or inside) and is demountable from a tool main body of a battery-powered portable tool, wherein at least one all-solid-state battery cell is contained within a housing of the battery pack, the battery pack has an electric energy storage capacity of 200 Wh/kg or more and/or 300 Wh/l or more, and the all-solid-state battery cell(s) is (are) shielded or sealed from the atmosphere (external environment) by the housing of the battery pack. The description concerning shielding and/or sealing provided the above Aspect 19 is equally applicable to the present Aspect and is thus incorporated herein.

(Aspect 23) A battery pack that is mountable on (and/or inside), and is demountable from, a tool main body of a battery-powered portable tool, wherein:
at least one all-solid-state battery cell is contained within a housing of the battery pack,
the following relationship is satisfied:

(output when the battery temperature is −20° C.)/
(output when the battery temperature is +50° C.)>0.5;

the battery pack has an electric energy storage capacity of 200 Wh/kg or more and/or 300 Wh/l or more, and
the all-solid-state battery cell(s) is (are) shielded or sealed, preferably in a water-proof manner, from the atmosphere (external environment) by the housing of the battery pack.

The description concerning shielding and/or sealing provided the above Aspect 19 is equally applicable to the present Aspect and is thus incorporated herein.

(Aspect 24) A battery pack that is mountable on (and/or inside), and is demountable from, a tool main body of a battery-powered portable tool, wherein:
- at least one all-solid-state battery cell and an electrical circuit are contained within a housing of the battery pack;
- the electrical circuit comprises a low temperature measurement circuit and a high temperature measurement circuit; and
- an output of the low temperature measurement circuit is used to determine the temperature of the at least one all-solid-state battery cell when the temperature of the at least one all-solid-state battery cell is low (e.g., less than 10° C., or less than 20° C., or less than 30° C., etc.), and an output of the high temperature measurement circuit is used to determine the temperature of the at least one all-solid-state battery cell when the temperature of the at least one all-solid-state battery cell is high (e.g., greater than 50° C., or greater than 60° C., or greater than 70° C., etc.).

(Aspect 25) A battery pack that is mountable on (and/or inside), and is demountable from, a tool main body of a battery-powered portable tool, wherein:
- at least one all-solid-state battery cell and a temperature-measurement circuit for determining the temperature of the at least one all-solid-state battery cell are contained within a housing of the battery pack; and
- the temperature-measurement circuit comprises:
  - a high-temperature measurement circuit that on the one hand outputs accurate measurement results in a high-temperature range (e.g., greater than 50° C., or greater than 60° C., or greater than 70° C., etc.) and on the other hand outputs less accurate measurement results in a low-temperature range (e.g., less than 10° C., or less than 20° C., or less than 30° C., etc.);
  - a low-temperature measurement circuit that on the one hand outputs accurate measurement results in the low-temperature range and on the other hand outputs less accurate measurement results in the high-temperature range; and
  - a switching apparatus adapted/configured to determine the temperature of the at least one all-solid-state battery cell based on or from the output of the low-temperature measurement circuit when the output value of the high-temperature measurement circuit enters an abnormal range and determine the temperature of the at least one all-solid-state battery cell based on or from the output of the high-temperature measurement circuit when the output value of the low-temperature measurement circuit enters an abnormal range.

(Aspect 26) The temperature-measurement circuit according to the above Aspect 25 further includes the feature(s) of any one, two or all of the above Aspects 7-9.

(Aspect 27) A battery pack that is mountable on (and/or inside), and is demountable from, a tool main body of a battery-powered portable tool, wherein:
- at least one all-solid-state battery cell and a plurality of components are contained within a housing of the battery pack; and
- the plurality of components is disposed (arranged) in a first layout (a first physical configuration) when the temperature of the components is low (e.g., less than 5° C., or less than 0° C., or less than −5° C., etc.) and is disposed (arranged) in a second layout (a second physical configuration) when the temperature of the components is high (e.g., greater than 50° C., or greater than 60° C., or greater than 70° C., etc.), the second layout differing from the first layout.

(Aspect 28) A battery pack that is mountable on (and/or inside), and is demountable from, a tool main body of a battery-powered portable tool, comprising:
- a warming apparatus configured to warm an electronic component within the battery pack when normal operation of the electronic component is not guaranteed due to the battery-powered portable tool being used (operated, run) in a low temperature environment (e.g., less than 5° C., or less than 0° C., or less than −5° C., etc.).

(Aspect 29) A battery pack that is mountable on (and/or inside), and is demountable from, a tool main body of a battery-powered portable tool, comprising:
- a warming-required component, which requires warming when the temperature is low (e.g., less than 5° C., or less than 0° C., or less than −5° C., etc.),
- a heat-dissipation-required component, which requires heat dissipation when the temperature is high (e.g., greater than 50° C., or greater than 60° C., or greater than 70° C., etc.),
- a heater, which warms the warming-required component,
- a substrate, on which the warming-required component, the heat-dissipation-required component, and the heater are mounted,
- a heat-dissipating member, and
- a bimetal;
- wherein the bimetal changes shape (possesses a property that its shape is changeable in at least one dimension) dependent on the temperature of the bimetal to bring the heat-dissipation-required component and the heat-dissipating member into contact when the temperature is high (e.g., above a first predetermined temperature threshold), and to move the heat-dissipation-required component and the heat-dissipating member into a noncontacting state when the temperature is low (e.g., below a second predetermined temperature threshold, which may be the same as or different from the first predetermined temperature threshold).

(Aspect 30) The bimetal of the above Aspect 29 further comprises the feature(s) of the above Aspect 12 and/or 13.

(Aspect 31) A battery pack that is mountable on (and/or inside), and is demountable from, a tool main body of a battery-powered portable tool, comprising:
- a warming-required component, which requires warming (heating) when the temperature is low (e.g., below a first predetermined temperature threshold), in order to operate normally (e.g., at or above a predetermined output),
- a heat-dissipation-required component, which requires heat dissipation (e.g., to avoid premature damage) when the temperature is high (e.g., above a second predetermined temperature threshold, which may be the same as or different from the first predetermined temperature threshold), and
- a heater adapted/configured to heat the warming-required component;
- wherein the thermal resistance between the warming-required component and the heater is lower than the thermal resistance between the heat-dissipation-required component and the heater.

(Aspect 32) A battery pack that is mountable on (and/or inside), and is demountable from, a tool main body of a battery-powered portable tool, comprising:
- a warming-required component, which requires warming when the temperature is low (e.g., below a first predetermined temperature threshold), in order to operate normally (e.g., at or above a predetermined output),
- a heat-dissipation-required component, which requires heat dissipation (e.g., to avoid premature damage) when the temperature is high (e.g., above a second predetermined temperature threshold, which may be the same as or different from the first predetermined temperature threshold), and
- a heater adapted/configured to warm the warming-required component, wherein
- the thermal resistance between the warming-required component and the heater is lower than the thermal resistance between the warming-required component and the heat-dissipation-required component.

The additional features of Aspect 15 are equally applicable to Aspect 32 and are thus incorporated herein.

(Aspect 33) The battery pack according to the above Aspect 31 or 32, wherein at least the warming-required component, the heater, and the portion of the substrate interposed between the warming-required component and the heater are covered by a solid isolating (insulating) material that isolates (insulates) such components from the surrounding atmosphere.

(Aspect 34) A battery pack that is mountable on (and/or inside), and is demountable from, a tool main body of a battery-powered portable tool, comprising:
- at least one all-solid-state battery cell is contained within a housing of the battery pack and;
- a terminal, e.g., disposed and/or exposed on an exterior surface of the housing, the terminal being adapted/configured to output a signal that indicates whether or not the all-solid-state battery cell(s) is (are) in a discharge-capable state (i.e. the battery cell(s) is/are in a state that it/they can supply current to the tool, e.g., without causing premature damage to the battery cell(s)).

(Aspect 35) A battery pack that is mountable on (and/or inside), and is demountable from, a tool main body of a battery-powered portable tool, comprising:
- at least one all-solid-state battery cell is contained within a housing of the battery pack; and
- a terminal, e.g., disposed and/or exposed on an exterior surface of the housing, the terminal being adapted/configured to that output a signal that indicates whether or the all-solid-state battery cell(s) is (are) in a recharge-capable state.

In the above Aspect 34 or 35, the battery pack may further comprise a controller, e.g., a microprocessor, configured or programmed to assess the condition/state of the battery cell(s) and generate the corresponding signals.

For example, in one embodiment of the above Aspect 34, the battery pack may further comprise a battery-condition determination circuit, such as, e.g., a controller (e.g., a microprocessor), that is electrically connected to the at least one all-solid-state battery cell and to the terminal and is adapted/configured/programmed to: (i) assess whether or not the at least one all-solid-state battery cell is in the discharge-capable state and (ii) generate the signal based on the assessed condition.

Furthermore, in one embodiment of the above Aspect 35, the battery pack may further comprise a battery-condition determination circuit, such as, e.g., a controller (e.g., a microprocessor), that is electrically connected to the at least one all-solid-state battery cell and to the terminal and is adapted/configured/programmed to: (i) assess whether or not the at least one all-solid-state battery cell is in the recharge-capable state and (ii) generate the signal based on the assessed condition.

(Aspect 36) A tool main body of a battery powered portable tool comprising:
- a portion (battery mount part) on and/or inside which a battery pack, which contains at least one all-solid-state battery cell, is mountable (electrically and physically connected);
- wherein the portion (battery mount part) comprises:
- a terminal, e.g., disposed and/or exposed on an exterior surface of the portion, the terminal being adapted/configured to outputs and/or input a signal that indicates whether or not the all-solid-state battery cell(s) is (are) in a discharge-capable state.

(Aspect 37) A tool main body of a battery powered portable tool comprising:
- a portion (battery mount part) on and/or inside which a battery pack, which contains at least one all-solid-state battery cell, is mountable (electrically and physically connected);
- wherein the portion (battery mount part) comprises:
- a terminal, e.g., disposed and/or exposed on an exterior surface of the housing, the terminal being adapted/configured to output and/or input a signal that indicates whether or not the all-solid-state battery cell(s) is (are) in a recharge-capable state.

In the Aspect 36 or 37, the tool main body may further comprise a controller, e.g., a microprocessor, configured or programmed to assess the condition/state of the battery cell(s) and generate the corresponding signals.

For example, in one embodiment of the above Aspect 36, the tool main body may further comprise a battery-condition determination circuit, such as, e.g., a controller (e.g., a microprocessor), that is electrically connectable to the at least one all-solid-state battery cell and to the terminal and is adapted/configured/programmed to: (i) assess whether or not the at least one all-solid-state battery cell is in the discharge-capable state and (ii) generate the signal based on the assessed condition.

Furthermore, in one embodiment of the above Aspect 37, the tool main body may further comprise a battery-condition determination circuit, such as, e.g., a controller (e.g., a microprocessor), that is electrically connectable to the at least one all-solid-state battery cell and to the terminal and is adapted/configured/programmed to: (i) assess whether or not the at least one all-solid-state battery cell is in the recharge-capable state and (ii) generate the signal based on the assessed condition.

(Aspect 38) The tool main body according to the above Aspect 36 or 37, comprising:
- a regenerative-charging inhibiting apparatus that inhibits regenerative charging while the signal that indicates that the all-solid-state battery cell is in a non-rechargeable state is being input.

The regenerative-charging inhibiting apparatus may be a part of the battery-condition determination circuit or controller (e.g., a program code or algorithm stored in a memory of a microprocessor), or the regenerative-charging inhibiting apparatus may be embodied in a separate discrete circuit, controller, etc.

(Aspect 39) The tool main body or battery pack according to any preceding Aspect, wherein the battery pack contains a plurality of all-solid-state battery cells, each having a conductive material (e.g., electrolyte) between positive and negative electrodes thereof that is solid (in the solid fundamental state) at a temperature of 100° C. or higher and optionally the conductive material is a semiconductor, an electrically-conductive ceramic, glass or polymer. For example, the solid conductive material may be a silicon-based semiconductor or a ceramic, such as ITO, IZO or AZO.

(Aspect 40) A battery pack comprising at least one all-solid-state battery cell, at least one circuit board, at least one first terminal and a housing, wherein the at least one all-solid-state battery cell and the circuit board are enclosed within the housing, the first terminal extends through a wall of the housing from an interior chamber of the housing to an exterior surface of the housing, the first terminal is insert-molded with the housing wall, and the interior chamber of the housing is shielded or waterproofed or sealed from an exterior of the housing such that, e.g., the ingress of at least water and dust having a particle size of, e.g., 5 nm or more, into the interior chamber are blocked. In other words, the positive and negative electrodes of the at least one solid-state battery cell are encased within a water-proof and/or dust-proof housing or enclosure, which housing or enclosure may form an exterior surface of the battery pack or which housing or enclosure may be accommodated within an exterior housing that forms the exterior surface of the battery pack. Therefore, because the ingress of foreign matter (e.g., water, dust, metal shards or powder, etc.) is effectively blocked from reaching the positive and negative electrodes of the at least one solid-state battery cell, premature corrosion and/or shorting of the positive and negative electrodes of the at least one solid-state battery cell can be prevented more effectively than in battery pack designs that require a cooling air flow path (in which dust, water, metal shards, etc. may be entrained in the cooling air that flows therethrough) through the housing that holds the battery cell(s).

(Aspect 41) The battery pack according to the above Aspect 40, wherein the at least one all-solid-state battery cell is electrically connected to the circuit board within the housing, the first terminal is electrically connected to the circuit board within the housing, and a second terminal of a tool main body is adapted/configured to be electrically connected to the first terminal on exterior of the housing.

(Aspect 42) The battery pack according to the above Aspect 41, further comprising a cover fixed to the housing, wherein the second terminal of the tool main body is configured to pass through a hole formed on the cover, and an outer side end of the first terminal is covered by the cover.

(Aspect 43) The battery pack according to any one of the above Aspects 40-42, wherein the first terminal is a positive (battery) terminal, and the battery pack further comprises a negative (battery) terminal and at least one signal (communication) terminal.

(Aspect 44) The battery pack according to any one of the above Aspects 40-43, wherein the housing comprises an upper housing and a lower housing, and the first terminal is insert-molded with the upper housing.

(Aspect 45) The battery pack according to the above Aspect 44, wherein at least one of the upper housing and the circuit board is provided with a position-holding structure that respectively holds the upper housing and the circuit board in predetermined positions relative to each other, i.e. such that the position of the upper housing relative to the circuit board does not change.

(Aspect 46) The battery pack according to the above Aspect 44 or 45, wherein a waterproof seal member is provided between the cover and the upper housing, and the waterproof seal member seals a gap between the cover and the upper housing in at least a water-proof manner when the cover is fixed to the lower housing.

Working Examples

FIG. 1 shows the external appearance of a battery pack 174 that contains a plurality of all-solid-state battery cells (shown as cell group 171 in FIG. 21, or battery cells 12, 14, 16, 18 in FIG. 25), and a tool main body 180, on which and/or inside which the battery pack 174 is mountable and from which it is demountable. Herein, the term "battery pack" is meant to be interchangeable with other commonly-used terms in the power tool field, such as "battery cartridge", "rechargeable battery" or simply "battery". The external appearance of the battery pack 174 (e.g., the rigid polymer housing and the battery terminal portion) may be substantially the same as a battery pack that contains lithium-ion battery cells, each of which contains an electrolytic fluid or gel that is not solid at normal operating temperatures (e.g., between 0-50° C.). Because the characteristics (e.g., internal resistance, voltage, current output, etc.) of all-solid-state battery cells do not degrade much even at high temperature, little or no cooling is required and the cells can be disposed in close contact with one another in battery packs 174 of the present teachings. As a result, the volume of a battery pack 174 that uses all-solid-state batteries may be reduced as compared to a lithium ion battery pack having the same rated voltage and capacity (amp-hours). In addition, because packaging (isolating/protective material that shields the battery cells from moisture, etc.) is not required for each individual cell, the weight of a battery pack 174 that uses all-solid-state batteries is reduced as compared to corresponding lithium ion battery packs. A battery pack 174 that contains all-solid-state battery can be mounted on (and/or inside), and can be demounted from, a variety of types of tool main bodies 180 (tool housings, in particular a battery mount part) that may be used either in the state in which they are supported (held) by a user or in a state supported on a surface, such as the ground, a workbench or a working material. A battery powered tool 1 is completed by mounting the battery pack 174 on the tool main body 180. The battery powered tool 1 is portable and can be carried to a required working place by a user and can be used there.

Because lithium-ion battery cells containing an electrolytic fluid or gel require cooling at elevated temperatures to prevent internal pressure buildup and thus possibly permanent damage, a lithium-ion battery pack requires a cooling air passage within the battery pack, which means that the housing of the lithium-ion battery pack will necessarily have a complicated internal shape and/or structure. On the other hand, because all-solid-state batteries do not need cooling, battery packs 174 of embodiments of the present teachings do not need any cooling air passage. Consequently, in such battery packs 174 of the present teachings, it is much easier to shield, seal or water-proof the battery cell(s) 12, 14, 16, 18 from the atmosphere by providing an at least water-proof housing or enclosure that contains the battery cell(s), as will be further explained below. Thus, the battery pack 174 of this embodiment may be lighter, more compact and have improved weatherability properties as compared to known lithium-ion battery packs.

Figure 2:
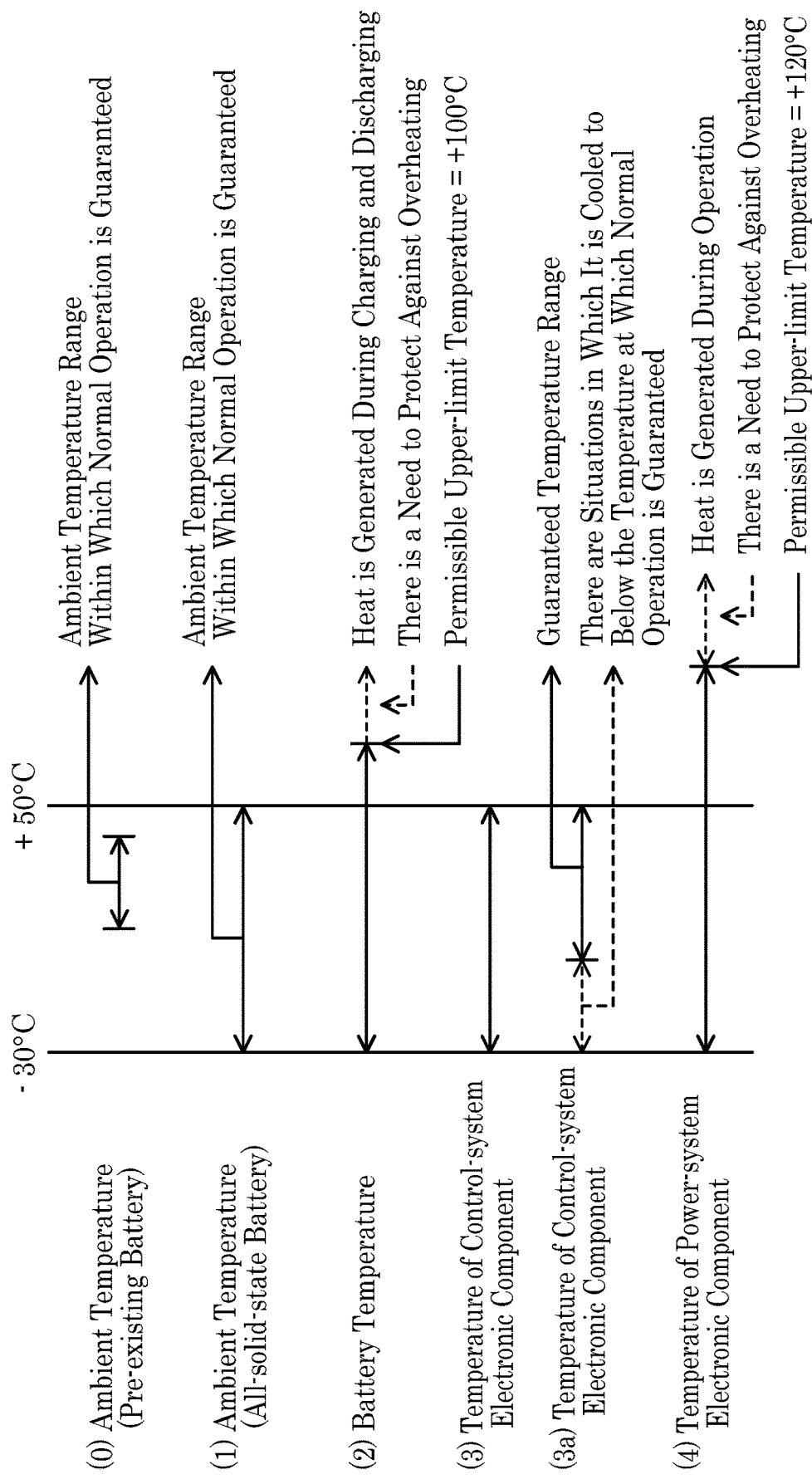
FIG. 2 explains the relationships between various temperature ranges.

FIG. 2 shows the ambient temperature and the temperature of a component that requires temperature measurement because its characteristics vary with changes in temperature. Due to the effects of warming, heat generation, heat dissipation, and the like, the temperature of the component becomes a temperature that differs from the ambient temperature. It is noted that FIG. 2 is merely one example, and the present invention is not limited to the examples shown in the drawings.

In FIG. 2, line (1) shows the ambient-temperature range within which the manufacturer of a battery-powered portable tool of the working example guarantees normal operation. Line (0) shows the normal-operation guaranteed temperature range (normally, approximately 0° C. to +40° C.) of known battery-powered portable tools. The normal-operation guaranteed temperature range of the battery-powered portable tool of the following working examples is wider on both the low-temperature side and the high-temperature side.

Line (2) shows the variation width of the battery temperature when used at the ambient temperature of line (1). The temperature on the low-temperature side of the normal-operation guaranteed temperature range shown in line (1) corresponds to the temperature at which freezing occurs if an electrolytic fluid is used. Because the battery cell(s) generate heat during charging and discharging, there are situations in which the temperature rises above the ambient temperature. When an electrolytic fluid is used in the battery cells, there is a possibility that, when the battery temperature rises, the internal pressure of the cell(s) will rise owing to gas emanating within the electrolytic fluid, thereby damaging the cell(s). Accordingly, if an electrolytic fluid or gel (i.e. a liquid) is used, then there is a need to prevent the pressure of the gas emanating within the electrolytic fluid from rising excessively, and there is a need to limit discharging so that the battery temperature does not rise above 80° C. In battery-powered portable tools 1 according to the working examples, the upper limit of the battery temperature may be raised, e.g., to approximately 100° C. or even higher, and thereby the temperature range within which control is needed to limit discharging so as to prevent overheating is shifted to the high-temperature side.

Line (3) of FIG. 2 shows the temperature of a control-system electronic component or components, e.g., a microprocessor, that is (are) powered using relatively low power. Because the amount of heat generated by the control-system electronic component(s) is small, in practice its temperature is substantially equal to the ambient temperature.

Line (3a) of FIG. 2 shows the temperature range within which the control-system electronic component(s) operate(s) normally. The minimum temperature of the normal-operation guaranteed temperature range shown in (1) is lower than the minimum temperature of the temperature range within which the control-system electronic component(s) operate(s) normally. A technique is needed to enable the battery-powered portable tool to operate normally even in the circumstance in which the ambient temperature falls below the lower-limit value of the temperature range within which the control-system electronic component(s) operate(s) normally.

Line (4) of FIG. 2 shows the temperature of a power-system electronic component or components that generate(s) heat when operating (e.g., a transistor that performs inverter control of a motor or a transistor inside a battery pack that protects the battery by disabling charging and discharging), wherein the temperature rises above the ambient temperature owing to the generation of heat. In this (these) power-system electronic component(s), because an upper-limit temperature, up to which the component operates normally, exists, a technique is needed to protect the power-system electronic component(s) so that it (they) do(es) not exceed the upper-limit temperature owing to the generation of heat by the electronic part(s).

Figure 3:
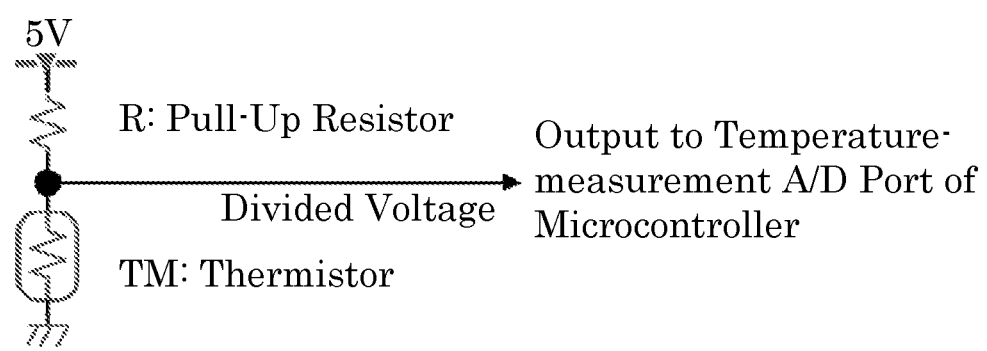
FIG. 3 shows a detection part of a known temperature-measurement circuit according to the prior art.

FIG. 3 shows one example of a known temperature-measurement circuit, which uses a series circuit in which a pull-up resistor R and a thermistor TM are connected in series. One end (terminal) of the pull-up resistor R side is connected to a constant voltage (e.g., 5 V), and one end (terminal) of the thermistor TM side is connected to ground. The voltage at the connection point between the pull-up resistor R and the thermistor TM is a voltage that is divided by the resistance value of the pull-up resistor R and the resistance value of the thermistor TM, which varies in accordance with thermistor temperature. Because the resistance value of the thermistor TM varies with temperature, the above-mentioned divided voltage varies dependent upon the temperature. If the divided voltage is read, e.g., by a microcontroller, then the temperature of the thermistor TM can be measured.

Figure 4:
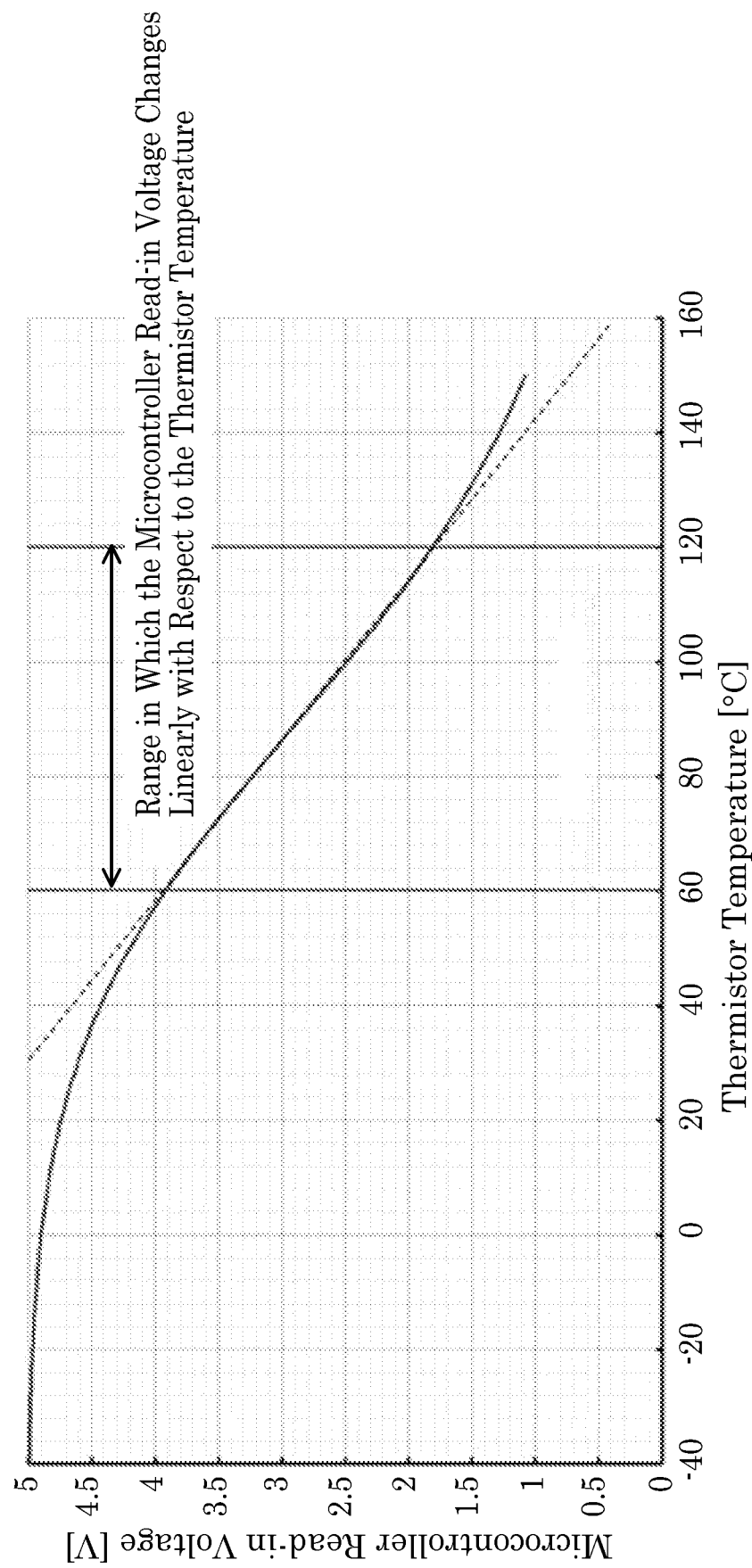
FIG. 4 shows the relationship between the voltage that is output by the known (prior art) detection part shown in FIG. 3 and a thermistor temperature.

FIG. 4 shows the relationship for the case in which the abscissa represents the thermistor temperature and the ordinate represents the above-mentioned divided voltage. The divided voltage is equal to the microcontroller read-in voltage. Because the thermistor-resistance value decreases when the thermistor temperature rises, the divided voltage decreases when the thermistor temperature rises.

Based on the temperature characteristics of the thermistor TM, the temperature range within which the divided voltage varies linearly with respect to the thermistor temperature is limited. In the case of FIG. 4, the above-mentioned linear relationship holds between +60° C. and +120° C. That is, in the temperature range in which the thermistor temperature is +60° C. or lower, the above-mentioned linear relationship is not obtained, and the thermistor temperature calculated from the above-mentioned divided voltage deviates from the actual thermistor temperature.

Figure 5:
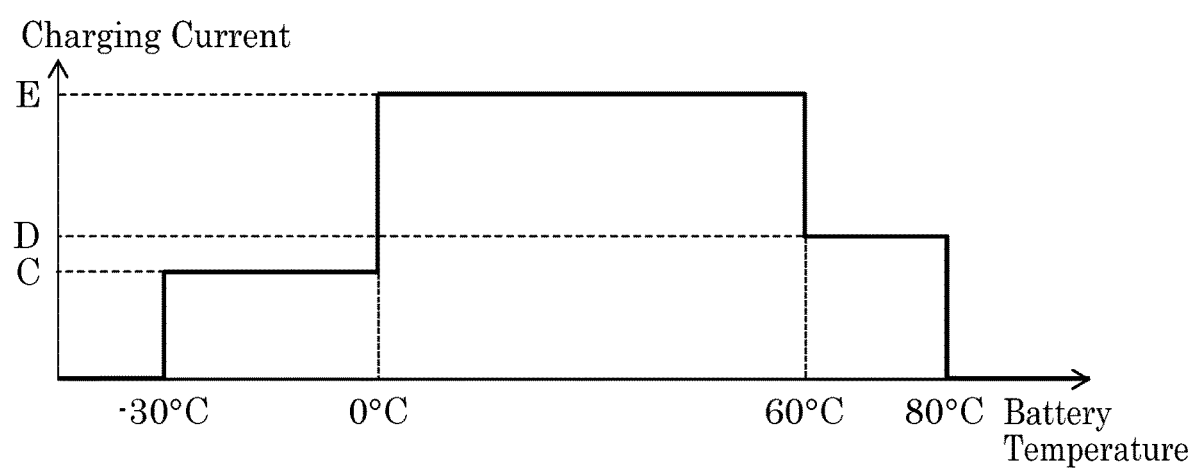
FIG. 5 shows a relationship between charging current and battery temperature of a battery pack in which all-solid-state battery cells are used according to the present teachings.

FIG. 5 shows the relationship between the temperature of the all-solid-state battery (battery cell(s)) and the charging current permitted to be supplied to the all-solid-state battery. It is noted that, if a charging current above a permissible value is supplied to the all-solid-state battery, the battery life will decrease owing to damage caused to one or more of the all-solid-state battery cells. As is clear also from FIG. 5, the permissible value (upper limit) of the charging current changes at −30° C., 0° C., +60° C., and +80° C., and therefore it is understood that there is a need to accurately measure the battery temperature in the vicinities of −30° C., 0° C., +60° C., and +80° C. For example, if the temperature-measurement accuracy in the vicinity of −30° C. is low, there is a problem in that charging might be prohibited even at a temperature that allows the charging current to flow, and conversely charging may be inappropriately performed at a temperature that does not permit charging current to flow (i.e. at a battery temperature that might cause permanent damage to the battery cells).

In a temperature-measurement circuit that has the characteristics shown in FIG. 4, the temperature in the vicinities of −30° C. and 0° C. cannot be measured accurately, and therefore the battery might not be charged properly in this temperature range.

Figure 6:
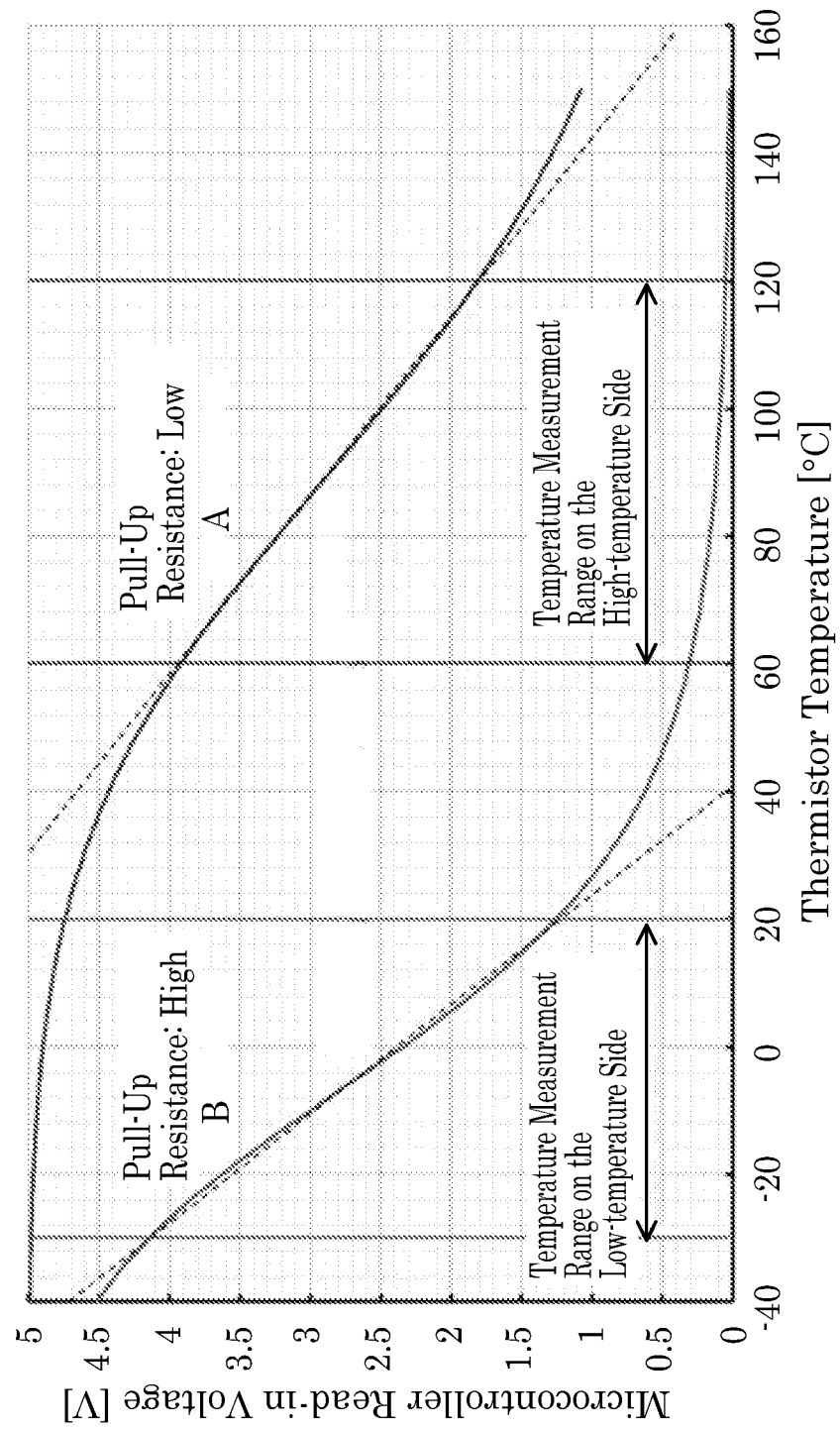
FIG. 6 shows the relationship between the voltage that is output by the detection part shown in FIG. 7 and the thermistor temperature.

In curve A shown in FIG. 6, the above-mentioned linear relationship exists between +60° C. and +120° C. mentioned above; and in curve B, the linear relationship exists between −30° C. and +20° C.

Figure 7:
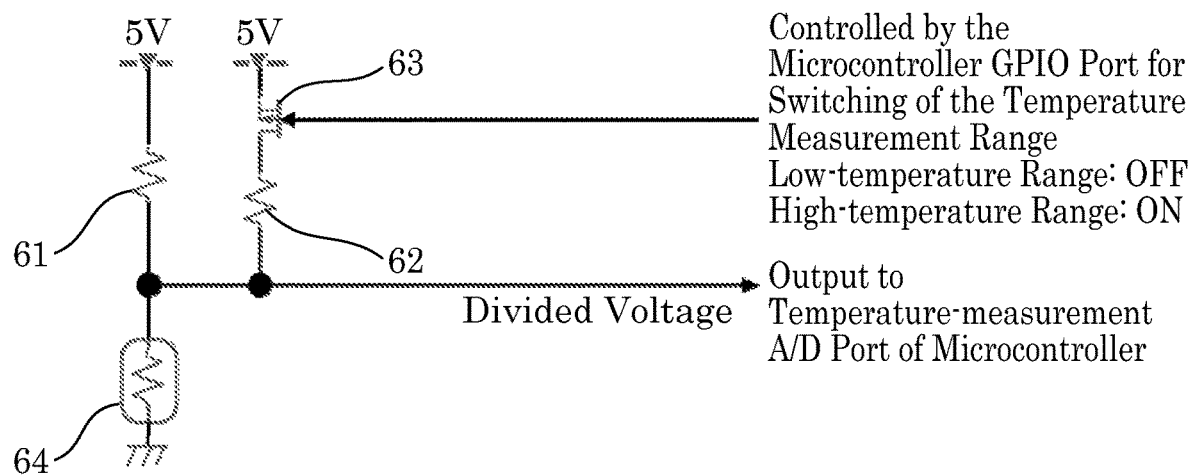
FIG. 7 shows the detection part of the temperature-measurement circuit of working example 1 according to the present teachings.

FIG. 7 shows a circuit, such as a temperature-measurement circuit and/or a temperature-detection circuit, that combines a circuit that supplies the divided voltage of curve A and a circuit that supplies the divided voltage of curve B. To achieve such an embodiment, two pull-up resistors 61, 62 are connected in parallel, and a transistor 63 is interconnected between the pull-up resistor 62 and the constant voltage source. The transistor 63 is turned ON and OFF by the microcontroller, which is described below. A thermistor 64 is connected in series with the parallel circuit of the pull-up resistors 61, 62. A voltage that is divided by the pull-up resistance and the thermistor is input to the microcontroller. In the present working example, the resistance of the pull-up resistor 61 is 82 kΩ and the resistance of the pull-up resistor 62 is 1.5 kΩ.

When the transistor 63 is turned ON, 82 kΩ and 1.5 kΩ are connected in parallel, and therefore the effective pull-up resistance becomes 1.47 kΩ. Consequently, the divided voltage follows curve A (graph A) in FIG. 6. On the other hand, when the transistor 63 is turned OFF, the effective pull-up resistance becomes 82 kΩ and the divided voltage follows curve B (graph B) in FIG. 6.

When the above-mentioned divided voltage is input to the microcontroller, that microcontroller controls the ON/OFF state of the transistor 63. When the transistor 63 is turned ON, if the voltage that is input to the microcontroller is 4 V or more, then it is understood (i.e. determined by the microcontroller) that the thermistor temperature is +60° C. or lower. Therefore, the microcontroller performs switching so that the transistor 63 is turned OFF and the relationship of curve B (graph B) is obtained from the series connected resistor 61 and thermistor 64. If the thermistor temperature is in the range of −30° C. to +20° C., then the thermistor temperature can be measured accurately using the linear relationship indicated by curve B (graph B). When the transistor 63 is turned OFF, if the voltage that is input to the microcontroller is 1.2 V or less, then it is understood (i.e. determined by the microcontroller) that the thermistor temperature is +20° C. or higher. Therefore, the microcontroller performs switching so that the transistor 63 is turned ON and the relationship of curve A (graph A) is obtained from the parallel-connected resistors 61, 62 that are connected in series with the thermistor 64. If the thermistor temperature is in the range of +60° C. to +120° C., then the thermistor temperature can be measured accurately using the linear relationship indicated by curve A (graph A).

The circuit configuration when the transistor 63 is turned ON is one exemplary, non-limiting example of a circuit that will be referred to herein as "a high-temperature measurement circuit" because it can accurately measure the temperature of the battery cell(s) within the temperature range of +60° C. to +120° C. (e.g., with an accuracy of +/−5° C. of the actual temperature of the battery cell(s), more preferably +/−3° C.) and outputs (detects) a voltage of 4 V or less. If the voltage output by the circuit configuration when the transistor 63 is turned ON exceeds 4 V, the microcontroller determines that the temperature of the battery cell(s) has become +60° C. or lower, which is outside of the accurate measurement range of the high-temperature measurement circuit, and can be called an "abnormal value" in the high-temperature measurement circuit. Thus, if the high-temperature measurement circuit measures (outputs) a voltage of 4 V or more, then it can be said that an abnormal value is being measured, and in this case the circuit (temperature-measurement circuit) switches to the low-temperature measurement circuit by turning the transistor 63 OFF.

The circuit configuration when the transistor 63 is turned OFF is one exemplary, non-limiting example of a circuit that will be referred to herein as "a low-temperature measurement circuit" because it can accurately measure the temperature range of −30° C. to +20° C. (e.g., with an accuracy of +/−5° C. of the actual temperature of the battery cell(s), more preferably +/−3° C.) and outputs (detects) a voltage of 1.2 V or more. If the voltage output by the circuit configuration when the transistor 63 is turned ON becomes less than 1.2 V, the microcontroller determines that the temperature of the battery cell(s) has become +20° C. or higher, which is outside of the accurate measurement range of the low-temperature measurement circuit, and can be called an "abnormal" value in the low-temperature measurement circuit. Thus, if the low-temperature measurement circuit measures (outputs) a voltage of 1.2 V or less, it can be said that an abnormal value is being measured, and in this case the circuit (temperature-measurement circuit) switches to the high-temperature measurement circuit by turning the transistor 63 ON.

If the voltage that is input to the microcontroller when the transistor 63 is turned ON is 4 V or more, and if the voltage that is input to the microcontroller when the transistor 63 is turned OFF is 1.2 V or less, then it is understood (i.e. determined by the microcontroller) that the thermistor temperature is +60° C. or lower, and +20° C. or higher, respectively, and it is not possible to measure beyond that with high accuracy. However, the inability to accurately measure within the temperature range of +20° C. to +60° C. does not present a problem in the present embodiment. The reason is that, as illustrated in FIG. 5, if, for example, the battery temperature is in the range of +20° C. to +60° C., then temperature-dependent control is unnecessary and there is no need to measure the temperature. That is because, when in the low-temperature range, warming control to deal with the low temperature is performed, and when in the high-temperature range, heat-dissipation control to deal with the high temperature is performed; in contrast, when the measured temperature is in center range, there is no need to perform temperature-dependent control.

When it is necessary to measure a temperature in the range of −30° C. to +120° C., the measurement range is normally split into two portions by using the low-temperature measurement circuit, in which the measurement range is set to −30° C. to approximately +45° C. (a measurement width of 75° C.), and the high-temperature measurement circuit, in which the measurement range is set to approximately +45° C. to +120° C. (a measurement width of 75° C.). In the present working example, taking note of the fact that there is no need to accurately measure temperature in the range of 20° C. to 60° C., a low-temperature measurement circuit, in which the measurement range is set to −30° C. to approximately +20° C. (a measurement width of 50° C.), and a high-temperature measurement circuit, in which the measurement range is set to approximately +60° C. to +120° C. (a measurement width of 60° C.), are used. When a measurement circuit in which the measurement range is 75° C. and a measurement circuit in which the measurement range is 50° C. to 60° C. have been compared, it has been found that the latter can measure temperature with a higher accuracy than the former. In the present working example, by setting the relationship such that the lower-limit temperature (+60° C.) that the high-temperature measurement circuit outputs with an accurate measurement result is higher than the upper-limit temperature (+20° C.) that the low-temperature measurement circuit outputs with an accurate measurement result, the measurable-temperature ranges of the high-temperature measurement circuit and the low-temperature measurement circuit are each narrowed, and measurement accuracy is increased for both the high and low temperature ranges.

In the present working example, there is a possibility that the battery temperature will fluctuate between −30° C. and +120° C. depending on the work environment and the operating conditions. In the temperature-measurement circuit shown in FIG. 3, which has the characteristics shown in FIG. 4, the range over which the temperature can be measured is insufficient. In contrast, by using the circuit (temperature-measurement circuit) shown in FIG. 7, in which the characteristics can be switched between curve A (graph A) and curve B (graph B) shown in FIG. 6, the battery temperature can be measured accurately both in the low-temperature range (the range of −30° C. to +20° C.) and in the high-temperature range (the range of +60° C. to +120° C.).

In the present working example, there is also a possibility that the temperature of one or more control-system electronic components (a component or components affected by the generation of heat by power-system electronic component(s) and whose temperature may rise above the ambient temperature) as well as the temperature of a power-system electronic component or components will fluctuate between −30° C. and +120° C.

If the thermistor 64 is placed in an environment in which the temperature is equal to the battery temperature, then, according to the present technique, the battery temperature can be measured accurately even if the temperature of the battery is in the low-temperature range or in the high-temperature range. Likewise, if the thermistor 64 is placed in an environment in which the temperature is equal to that of the control-system electronic component, then, according to the present technique, the temperature of the control-system electronic component can be measured accurately even if the temperature of the control-system electronic component is in the low-temperature range or in the high-temperature range. Likewise, if the thermistor 64 is placed in an environment in which the temperature is equal to that of the power-system electronic component, then, according to the present technique, the temperature of the power-system electronic component can be measured accurately even if the temperature of the power-system electronic component is in the low-temperature range or in the high-temperature range. By using the temperature-measurement circuit shown in FIG. 7, the temperature of each component that has a large temperature variation range can be measured accurately. The present technique of using the combination of the low temperature-measurement circuit and the high temperature-measurement circuit is not limited to only the battery temperature-measurement, and is also applicable to the temperature measurement of any electric device or component in the tool main body, such as the microprocessor and/or the current switching devices (power FETs).

The temperature-detection (temperature-measurement) circuit shown in FIG. 7 may be mounted (contained) inside the tool main body and/or inside the battery pack. The temperature-measurement circuit may be completed (become functional/operative) when the battery pack is attached to the tool main body.

In the present working example, the high-temperature measurement circuit and the low-temperature measurement circuit are provided in the temperature-measurement circuit, but the utility of the technique in which a circuit for high temperature and a circuit for low temperature are available and either is selected for use is not limited to the measurement of temperature. For example, there is also the case in which the technique of selectively using a protection circuit for high temperature and a protection circuit for low temperature is useful.

In FIG. 7, one end (terminal) of the fixed resistance is connected to the constant voltage (e.g., 5 V), and one end (terminal) of the thermistor is connected to ground. However, in another embodiment, the one end (terminal) of the fixed resistance may be connected to ground and one end (terminal) of the thermistor may be connected to the constant voltage. That is, the fixed resistance may be configured as a pull-up resistance or may be configured as a pull-down resistance.

Figure 8:
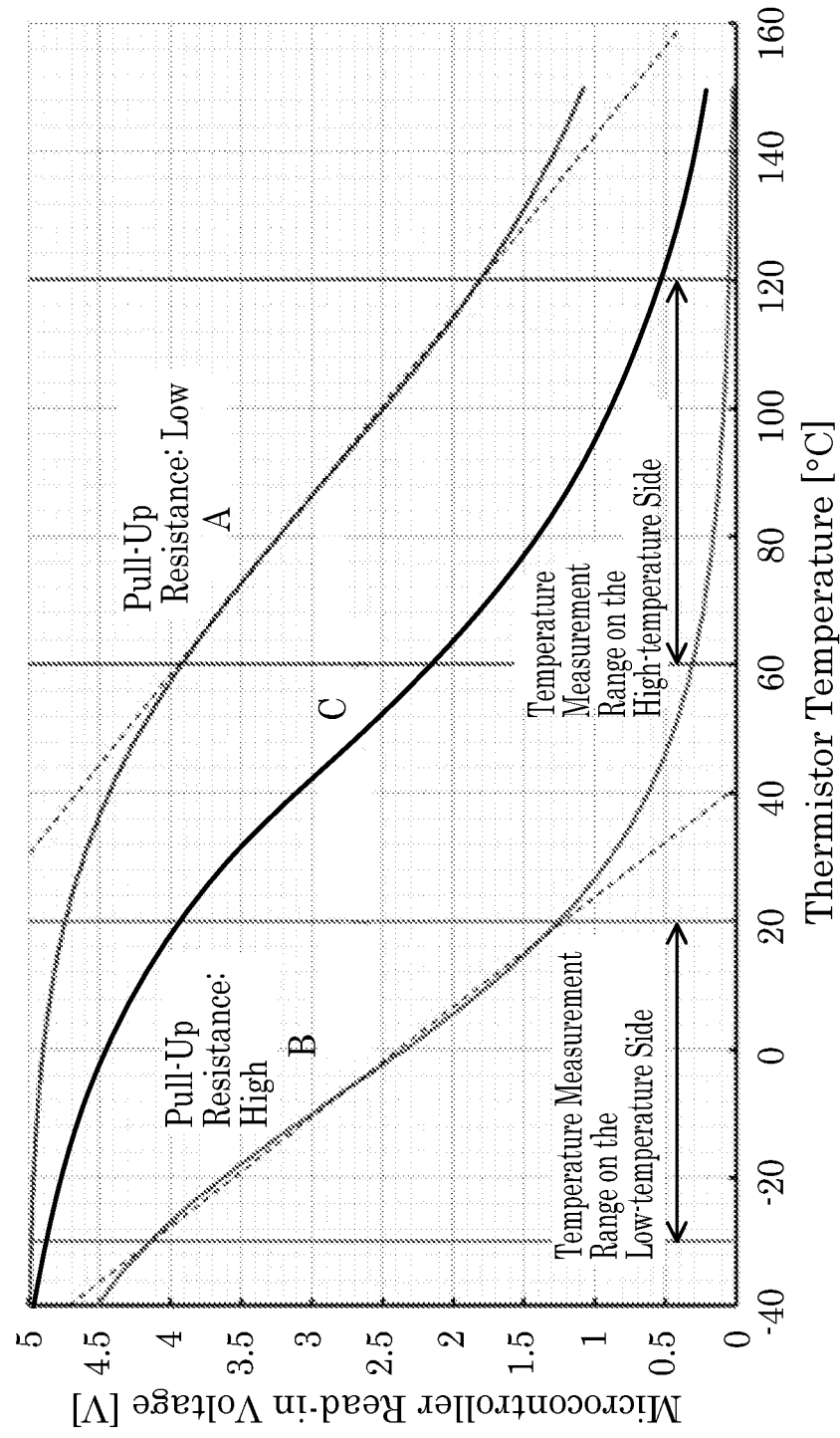
FIG. 8 shows the relationship between the voltage that is output by the detection part shown in FIG. 9 and the thermistor temperature.
Figure 9:
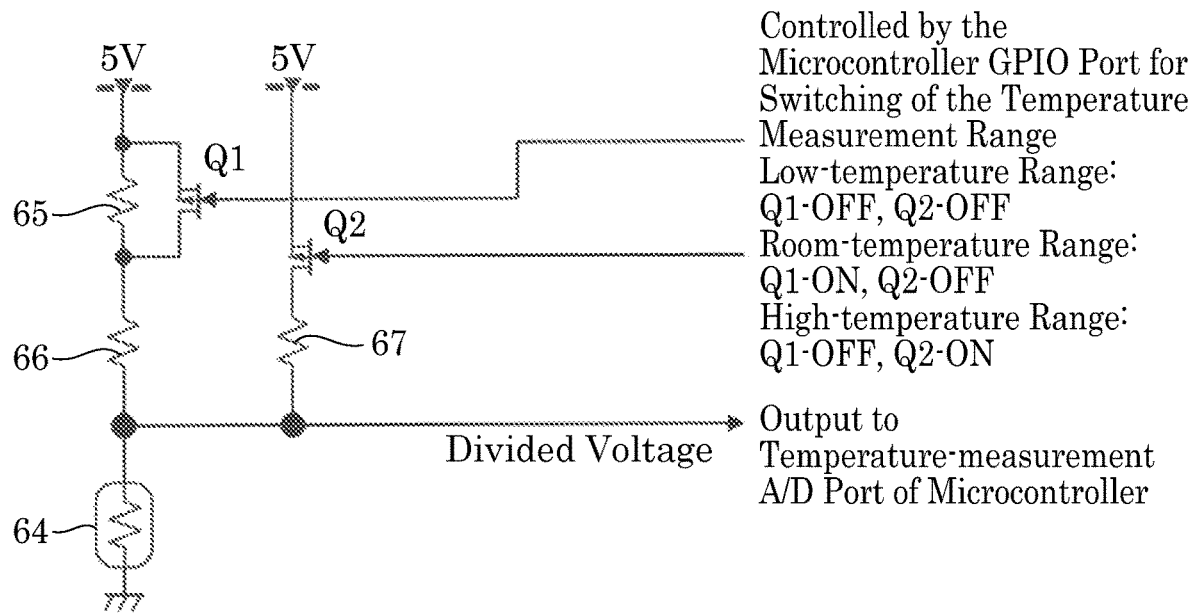
FIG. 9 shows working example 2 of the detection part of the temperature-measurement circuit according to the present teachings.

The circuit (temperature measurement circuit) shown in FIG. 6 and FIG. 7 switches between the high-temperature measurement circuit and the low-temperature measurement circuit, but measurement accuracy decreases when intermediate temperatures (temperatures in which a linear relationship is not established between the voltage and the temperature) are measured. To also measure a range of intermediate temperatures (room temperature) with high accuracy, for example, as shown in FIG. 8, a curve C (characteristic line C) may be added in which a linear relationship is established between the voltage and the temperature in the intermediate-temperature (e.g., room temperature) range. FIG. 9 illustrates a temperature-detection circuit (temperature measurement circuit) that provides the three curves A, B, C (characteristic lines A, B, C) shown in FIG. 8. The temperature-detection circuit (temperature measurement circuit) of FIG. 9 includes a first resistor 65 having a resistance of 75 kΩ, a second resistor 66 having a resistance of 8.2 kΩ that is connected to the first resistor 65, a third resistor 67 having a resistance of 1.5 kΩ that is connected in parallel with the first and second resistors 65, 66 and a thermistor 64, which is similar to the thermistor 64 of FIG. 7. If transistor switches Q1, Q2 are both turned OFF, then the pull-up resistance (or the pull-down resistance) becomes approximately 83 kΩ (i.e. the combined resistance of the first resistor 65 connected in series with the second resistor 66), such that the above-mentioned low-temperature measurement circuit is operative. On the other hand, if the transistor switches Q1, Q2 are both turned ON, then the pull-up resistance (or the pull-down resistance) becomes approximately 1.5 kΩ, and the above-mentioned high-temperature measurement circuit is operative. If the transistor switch Q1 is turned ON and the transistor switch Q2 is turned OFF, then the pull-up resistance (or the pull-down resistance) becomes approximately 8.2 kΩ, and the intermediate-temperature (room temperature) measurement circuit is operative.

Figure 10:
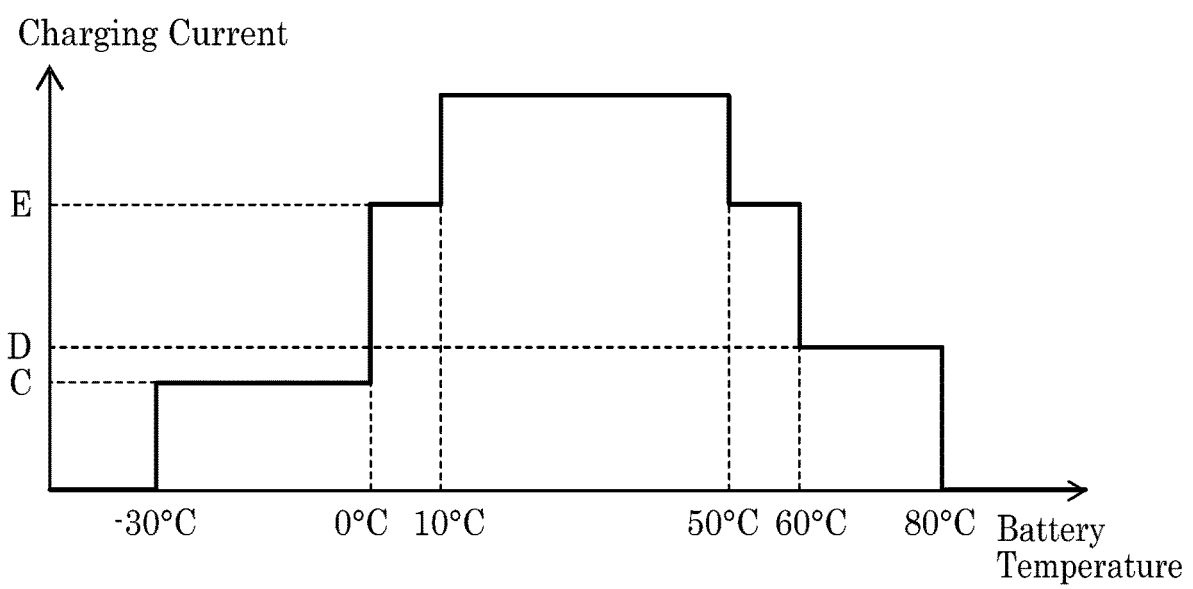
FIG. 10 shows (as a separate example from FIG. 5) a relationship between charging current and battery temperature of a battery pack in which all-solid-state battery cells are used according to the present teachings.

FIG. 10 shows a separate example of "the temperature of an all-solid-state battery and the (upper limit of the) charging current permitted to be supplied to the all-solid-state battery" shown in FIG. 5, and shows the cases in which the charging current is changed at approximately 10° C. and at approximately 50° C. In the circuit (temperature measurement circuit) shown in FIG. 7, which has the characteristics shown in FIG. 6, the measurement accuracy decreases at approximately 50° C. To implement the relationship shown in FIG. 10, it is preferable to use the circuit (temperature measurement circuit) shown in FIG. 9, which provides the characteristics shown in FIG. 8.

Figure 25:
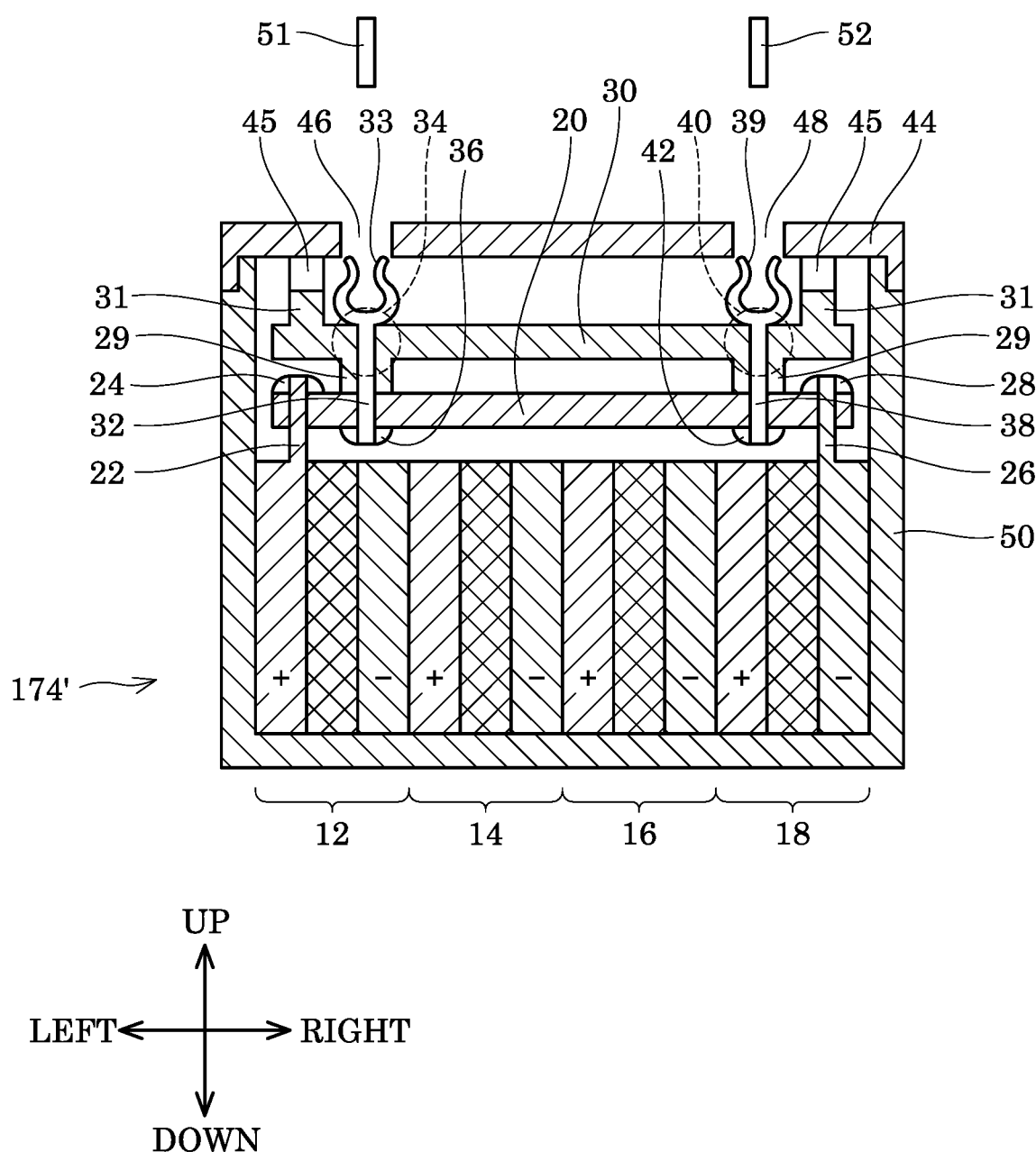
FIG. 25 shows one representative, non-limiting example of a battery pack according to the present teachings that shields or seals, e.g., in a water-proof manner, both all-solid-state battery cells and a control circuit board from the atmosphere.

FIG. 25 shows one representative, non-limiting example of a battery pack 174' that shields or seals all-solid-state battery cells 12, 14, 16, 18 and control circuit board 20 from atmosphere (external environment). More specifically, four all-solid-state battery cells 12, 14, 16, 18 are connected in series and are stored in lower housing 50. Each of the all-solid-state battery cells 12, 14, 16, 18 has a positive electrode and a negative electrode, as well as a solid electrolyte (e.g., any of the solid electrolytes or semiconductor materials that were described above) interposed between the positive electrode and the negative electrode. A positive terminal 22 extends upwards and passes through a hole in the control circuit board 20, and is connected, via solder 24, to a conductive track or pad formed on an upper surface of the control circuit board 20. A negative terminal 26 extends upwards and passes through another hole in the control circuit board 20, and is connected, via solder 28, to another conductive track or pad formed on the upper surface of the control circuit board 20. An upper housing 30 protects the all-solid-state battery cells 12, 14, 16, 18 and the control circuit board 20 from water, moisture, dust, etc. A positive terminal 32 and a negative terminal 38 pass through the upper housing 30. The positive terminal 32, negative terminal 38 and upper housing 30 are formed by an insert-molding method. Water cannot penetrate through the insert-molded portions 34, 40. More specifically, water cannot penetrate along a boundary (contact) surface between the positive terminal 32 and the upper housing 30 or along a boundary (contact) surface between the negative terminal 38 and the upper housing 30. The positive terminal 32 is connected, via solder 36, to a conductive track or pad formed on a lower surface of the control circuit board 20. The negative terminal 38 is connected, via solder 42, to another conductive track or pad formed on the lower surface of the control circuit board 20. An upper end (outer side end) of the positive terminal 32 projects above the upper housing 30, and a contact 33 is formed at the upper end of the positive terminal 32. An upper end (outer side end) of the negative terminal 38 projects above the upper housing 30, and a contact 39 is formed at the upper end of the negative terminal 38. On the upper surface of the upper housing 30, a ridge 31 runs along a periphery of the upper housing 30. Positioning bosses 29 are formed on the underside (lower) surface of the upper housing 30 and maintain (hold) the upper housing 30 and the circuit board 20 at predetermined positions relative to each other, i.e. the positioning bosses 39 ensure a predetermined spacing between the lower surface of the upper housing 30 and the upper surface of the circuit board 20. A cover 44 is affixed to the lower housing 50 and has a first hole 46, through which a positive terminal 51 of the tool main body (180) can pass. When the battery pack 174' is mounted to (on) the tool main body 180, the positive terminal 51 of the tool main body 180 passes through the first hole 46 and is thereby electrically connected to the positive terminal 32. The cover 44 also has a second hole 48, through which a negative terminal 52 of the tool main body can pass. When the battery pack 174' is mounted to (on) the tool main body 180, the negative terminal 52 of the tool main body 180 passes through the second hole 48 and is thereby electrically connected to the negative terminal 38. A seal material (e.g., a seal, such as an endless seal) 45 is adhered to a lower surface of the cover 44. The seal material 45 contacts the ridge 31 when the cover 44 is fixed to the lower housing 50 to form a seal that surrounds the contacts 33, 39. When the cover 44 is tightly affixed to the lower housing 50, water is blocked from penetrating through the boundary formed by the contacting surfaces of the cover 44 (namely the seal material 45) and the lower housing (namely the ridge 31). More specifically, when the cover 44 is fixed to the lower housing 50, the ridge 31 is tightly pressed against the seal material 45, thereby sealing a gap between the cover 44 and the upper housing 30 in an at least water-tight manner. As a result, the interior chamber of the housing, in which the battery cells 12, 14, 16, 18 and circuit board 20, enclosed or accommodated, is shielded (sealed) or waterproofed with respect to the exterior of the housing.

In the above structure, even if water penetrates through the cover 44 via the holes 46, 48, such water is stopped by the combination of the upper housing 30, ridge 31, and seal material 45. Consequently, the all-solid-state battery cells 12, 14, 16, 18 and control circuit board 20 are sealed (protected) from the ingress of foreign matter, such as water, moisture, dust, metal shards, etc. When the battery pack 174' is mounted to (on) the tool main body 180, the positive terminal 32 is connected to the positive terminal 51 of the tool main body 180 (equivalent to the terminal 181 shown in FIG. 21), and the negative terminal 38 is connected to the negative terminal 52 of the tool main body 180 (equivalent to terminal 183 shown in FIG. 21). One or more communication terminals (conductive plates or conductive pins—equivalent to terminals 182 shown in FIG. 21) for transmitting signals between the control circuit board 20 and the tool main body 180 may be formed with the upper housing 30 by the insert molding method at the same time with the positive and negative terminals 32, 38.

In the embodiment of FIG. 25, the battery pack 174' is adapted/configured to be mounted onto the tool main body 180 by moving the battery pack 174' upwardly, e.g., relative to a battery mounting part or handle portion of the tool main body 180. However, in the alternate embodiment shown in FIG. 1, the battery pack 174 is mounted on the tool main body 180 by moving the battery pack 174 horizontally (perpendicularly) to the battery mounting part or handle portion of the tool main body 180. In such an alternate embodiment, each of the holes 46, 48 may be changed to a horizontal slot.

In the battery pack structure of FIG. 25, the ridge 41 and seal material 45 tightly seal the gap between the cover 44 and the upper housing 30, and a waterproof space (enclosure) is formed by the lower housing 50, upper housing 30, ridge 41, seal material 45 and a portion of the cover 44. The battery cells 12, 14, 16, 18 and circuit board 20 are enclosed in the waterproof space and shielded (sealed) from the atmosphere. The terminals 32, 38 penetrate through the housing wall in a water-proof manner because the terminals 32, 38 are insert-molded with the housing wall. Outer side edges (contacts) 33, 39 of terminals 32, 38 are covered by the cover 44 (inside the cover), and the cover 44 prevents users from unintentionally attaching to the terminals 32, 38.

As was explained with reference to FIG. 2, battery-powered portable tools 1 according to the present teachings may be used in an environment in which the temperature is lower than the lower-limit value at which the control-system electronic component(s) operate(s) normally; in this case, it is necessary to warm the control-system electronic component(s) such that its (their) temperature is within the temperature range in which the control-system electronic component(s) operate(s) normally. In addition, as was explained above with reference to FIG. 2, because heat is generated when the power-system electronic components operate, it is necessary to dissipate that heat to prevent overheating. Here, the former is called a warming-required component, and the latter is called a heat-dissipation-required component. If the tool main body or battery back contains both one or more of such warming-required components and one or more such heat-dissipation-required components, a technique that enables both a warming apparatus and a heat-dissipating apparatus to be used in a compatible (non-interfering) manner becomes necessary. If the warming apparatus and the heat-dissipating apparatus are used in combination without adequate design precautions, then the heat of the warming apparatus might be inappropriately dissipated by the heat-dissipating apparatus such that the warming-required component cannot be adequately warmed.

Figure 11:
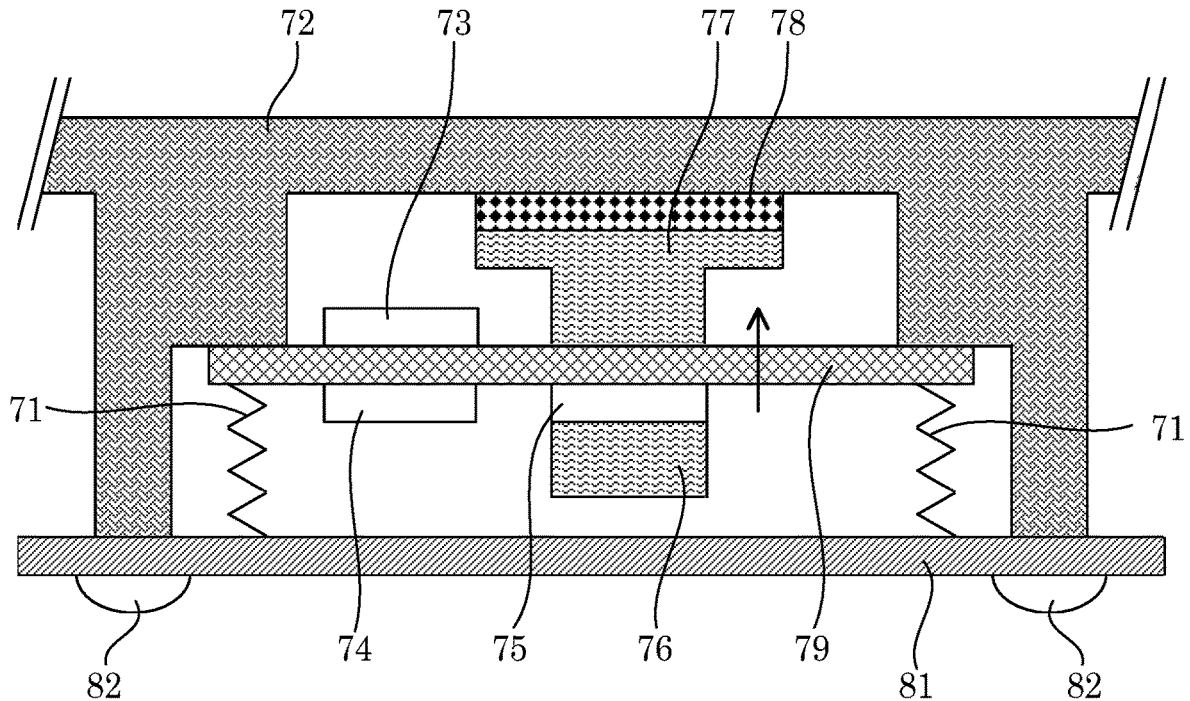
FIG. 11 shows the component layout (relative positional arrangement) of working example 1 when in a low-temperature environment.
Figure 12:
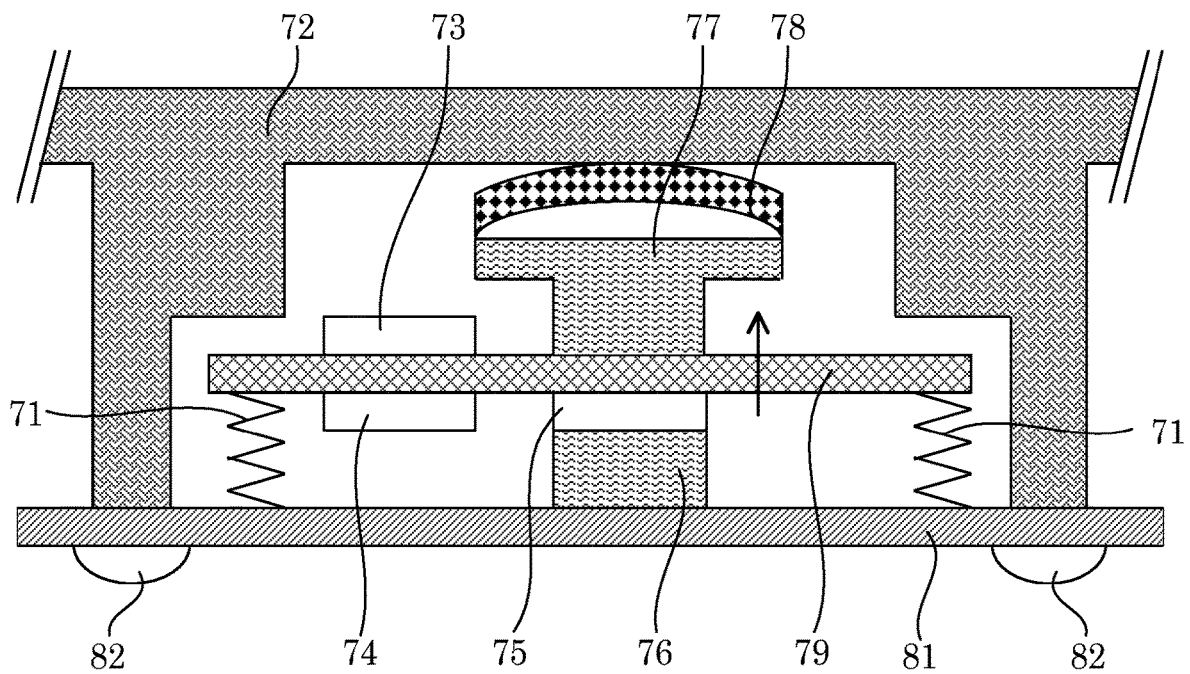
FIG. 12 shows the component layout (relative positional arrangement) of working example 1 when in a high-temperature environment.

FIG. 11 shows the layout (relative positional arrangement of components) of a motor-control circuit that is housed inside the tool main body. Reference numerals 71 indicate springs; reference numeral 79 indicates a substrate; reference numeral 72 indicates a housing; reference numeral 81 indicates a heat-dissipating member; reference numeral 82 indicates screws that fasten the heat-dissipating member 81 to the housing 72; reference numeral 73 indicates the warming-required component; reference numeral 74 indicates a warming heater; reference numeral 75 indicates the heat-dissipation-required component; reference numeral 76 indicates a heat-transfer block having a high thermal conductivity; reference numeral 77 indicates a heat-transfer block having a high thermal conductivity; and reference numeral 78 indicates a bimetal (e.g., a bimetal strip). FIG. 11 shows the layout (the relative positional relationships of the components) for the situation in which the bimetal 78 is at a low temperature (a temperature lower than the lower-limit temperature at which the warming-required component(s) operate(s) normally). FIG. 12 shows the layout for the situation in which the bimetal 78 is at a high temperature (when the temperature has risen to a temperature at which it is necessary to dissipate heat from the heat-dissipation-required component(s) to prevent overheating). In FIG. 11, the substrate 79 is raised by the urging force of the springs 71, whereby the heat-transfer block 76 and the heat-dissipating member 81 are isolated (separated) from each other. In FIG. 12, because the bimetal 78 is elongated owing to a temperature-related shape change, the substrate 79 is lowered, whereby the heat-transfer block 76 comes into contact with the heat-dissipating member 81. The housing 72 is formed of a resin (rigid polymer) having low thermal conductivity (e.g., less than or equal to about 0.5 W/(mK), preferably less than or equal to about 0.3 W/(mK)) and serves to insulate the bimetal 78 and the like from the surroundings. The heat-dissipating member 81 is formed of a material having high thermal conductivity (e.g., greater than or equal to about 200 W/(mK), preferably greater than or equal to about 300 W/(mK)). Therefore, when it is configured in the layout shown in FIG. 12, the heat of the heat-transfer block 76 is readily dissipated to the atmosphere via the heat-dissipating member 81.

The warming-required component 73 and the warming heater 74 are respectively affixed to the front and back of the substrate 79. Therefore, when the warming heater 74 is energized, the heat thereof passes through the substrate 79, reaches the warming-required component 73, and thereby warms the warming-required component 73. The housing 72 isolates (insulates) the surroundings of the warming-required component 73 and the warming heater 74 from the atmosphere, and thereby prevents (inhibits) the heat of the warming heater 74 from being robbed (absorbed) by the atmosphere. The substrate 79 constitutes a path through which the heat of the warming heater 74 is transferred to the heat-transfer block 76 via the heat-dissipation-required component 75. If the components are in the positional relationship (layout or configuration) shown in FIG. 12 while the warming heater 74 is operating and warming the warming-required component 73, then a heat conductive path is formed that enables the heat of the warming heater 74 to move to the heat-dissipating member 81 via the heat-dissipation-required component 75 and the heat-transfer block 76; as a result, the warming-required component 73 cannot be warmed sufficiently in the positional relationship shown in FIG. 12 owing to the transfer of heat to the heat-dissipating member 81. Therefore, to avoid this heat-dissipation problem, at a low temperature at which it is necessary to warm (heat) the warming-required component 73, the positional relationship (layout or configuration) changes to the arrangement shown in FIG. 11 because there is no need to dissipate the heat of the heat-dissipation-required component 75. When the components are arranged according to the positional relationship (layout or configuration) shown in FIG. 11, there is no longer a heat conductive path that facilitates the transfer of heat from the warming heater 74 to the heat-dissipating member 81 via the heat-dissipation-required component 75 and the heat-transfer block 76, owing to the fact that the heat-dissipation-required component 75 is now spaced apart (separated from) the heat-transfer block 76. Therefore, the warming-required component 73 can be warmed sufficiently, or at least by supplying less energy to the warming heater 74.

If the temperature of the warming-required component 73 rises to +5° C. or higher by virtue of the warming heater 74 being energized, then the warming heater 74 is turned OFF. On the other hand, if the warming heater 74 is turned OFF and the temperature of the warming-required component 73 is cooled (drops) to 0° C. or lower, then the warming heater 74 is turned ON.

When the temperature of the heat-dissipation-required component 75 rises and reaches a temperature at which heat dissipation is required, the bimetal 78 elongates (changes shape in at least one dimension) and the circuit switches from the layout (first configuration) shown in FIG. 11 to the layout (second configuration) shown in FIG. 12. In the second configuration, the heat-dissipation-required component 75 contacts the heat-dissipating member 81 via the heat-transfer block 76, thereby creating a heat transfer path that facilitates the transfer of heat from the heat-dissipation-required component 75 to the heat-dissipating member 81 via the heat-transfer block 76. Owing to this effective heat transfer path, the heat-dissipation-required component 75 can be sufficiently cooled to prevent it from overheating. The heat-transfer block 77 is configured such that (the temperature of) the heat-dissipation-required member 75 is thermally coupled to (the temperature of) the bimetal 78. Because the thermal conductivity of the housing 72 is low, the housing 72 does not rob (absorb) the heat of the bimetal 78. By switching between the layouts (first and second configurations) shown in FIG. 11 and FIG. 12, the warming apparatus and the heat-dissipating apparatus can coexist without inferring with the intended operation (performance) of the other.

Preferably, the following relationship is achieved: "the temperature at which heating of the warming-required component 73 is required"< (is less than) "the temperature at which heat dissipation of the heat-dissipation-required component 75 is required," and the temperature at which it is switched between the layouts shown in FIG. 11 and FIG. 12 should be therebetween. That is, it may be: "the switching temperature"= (equals) "a boundary temperature that distinguishes whether or not there is a need to warm the warming-required component 73"; or it may be: "the switching temperature"= (equals) "a boundary temperature that distinguishes whether or not there is a need to dissipate the heat of the heat-dissipation-required component 75." Preferably, the following relationship should be achieved: "the boundary temperature that distinguishes whether there is a need to warm the warming-required component 73"< (is less than) "the switching temperature in FIG. 11 and FIG. 12"< (is less than) "the boundary temperature that distinguishes whether or not there is a need to dissipate the heat of the heat-dissipation-required component 75."

Figure 13:
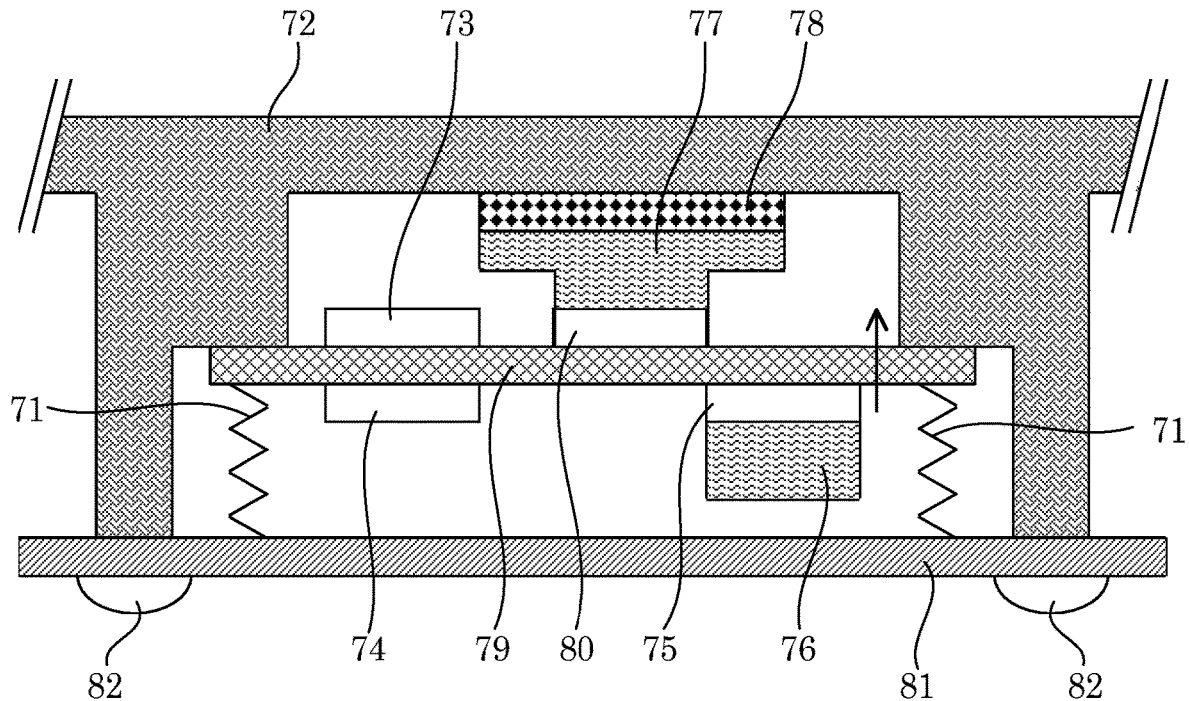
FIG. 13 shows the component layout (relative positional arrangement) of working example 2 when in a low-temperature environment.

Because of constraints on the layout of the circuit board, there are situations in which the bimetal 78 tends not to transfer the heat (temperature) of the heat-dissipation-required component 75. In this case, a configuration is used, as shown in FIG. 13, in which a heater 80 is added that heats and thereby modifies the shape of the bimetal 78. The heater 80 may be controlled, e.g., according to any one of the following ways.

(1) The heater 80 is energized when the temperature rises to a temperature at which the warming-required component 73 does not require heating.

(2) The heater 80 is energized when the temperature rises to a temperature at which the heat-dissipation-required component 75 requires heat dissipation.

(3) The heater 80 is energized at an intermediate temperature between (1) and (2).

Therefore, any one of (1) to (3) may be selected for operating the heater 80.

Figure 14:
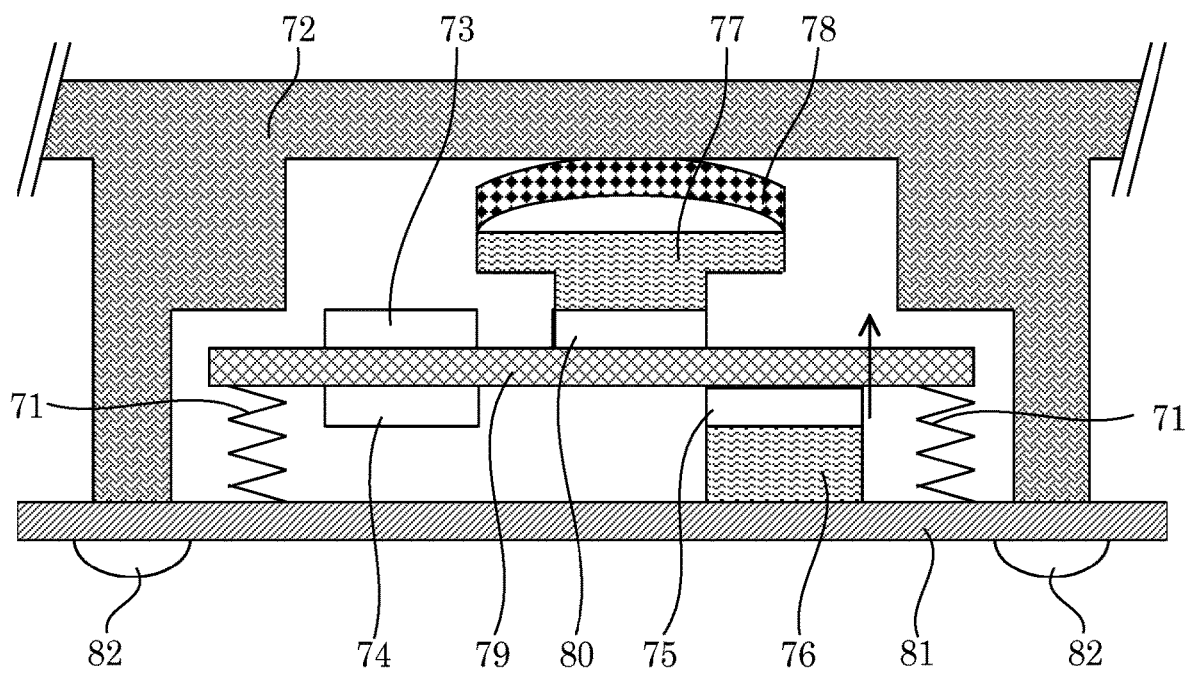
FIG. 14 shows the component layout (relative positional arrangement) of working example 2 when in a high-temperature environment.

FIG. 13 shows the layout (configuration) prior to the heater 80 being energized, and FIG. 14 shows the layout (configuration) in the state in which the heater 80 has been energized.

Figure 21:
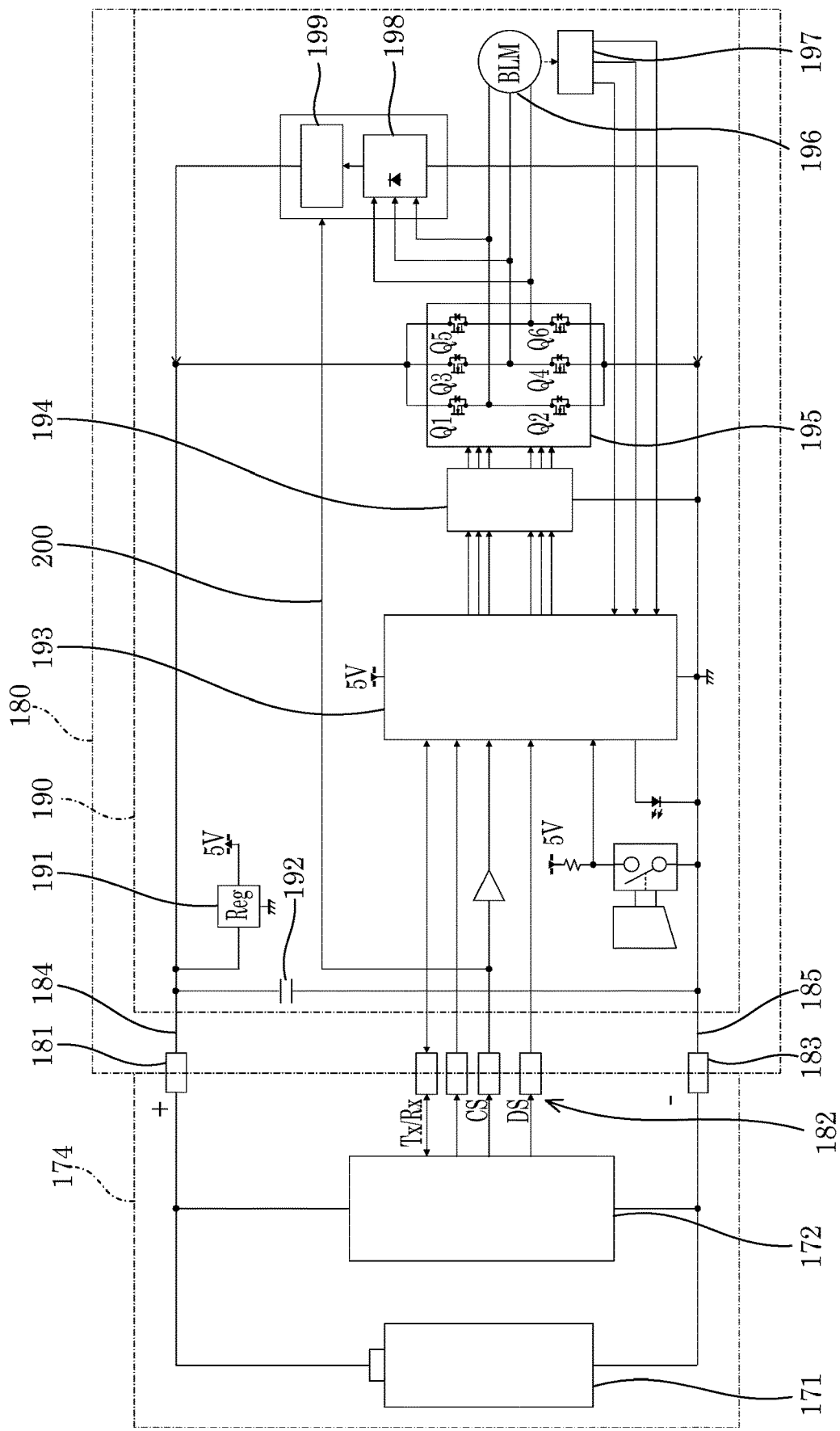
FIG. 21 shows an electrical circuit that may be used in one or more of the battery-powered portable tools of the working examples according to the present teachings.

The present technique can be applied to embodiments in which the heat of transistors, which constitute an inverter 195 that is discussed below with reference to FIG. 21, is dissipated, and a microcontroller 193 is warmed. That is, the present technique can be applied to the tool main body 180, wherein the various components are disposed within the tool main body 180.

Transistors (power-system electronic components that require heat dissipation), which inhibit the flow of a discharge current, and a microcontroller (a battery controller 172 that requires warming), which controls those transistors, are contained within a battery pack 174. In this case, the above-mentioned techniques shown in FIGS. 11-14 can be applied to the battery pack 174, 174', i.e. wherein the various components are disposed within battery pack 174, 174'.

Figure 15:
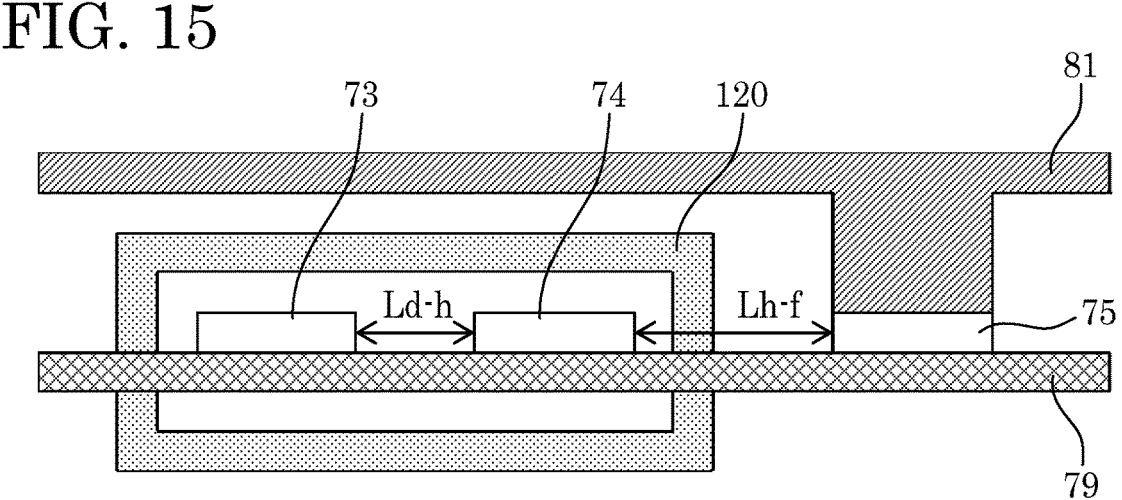
FIG. 15 shows the component layout (relative positional arrangement) of working example 3.
Figure 16:
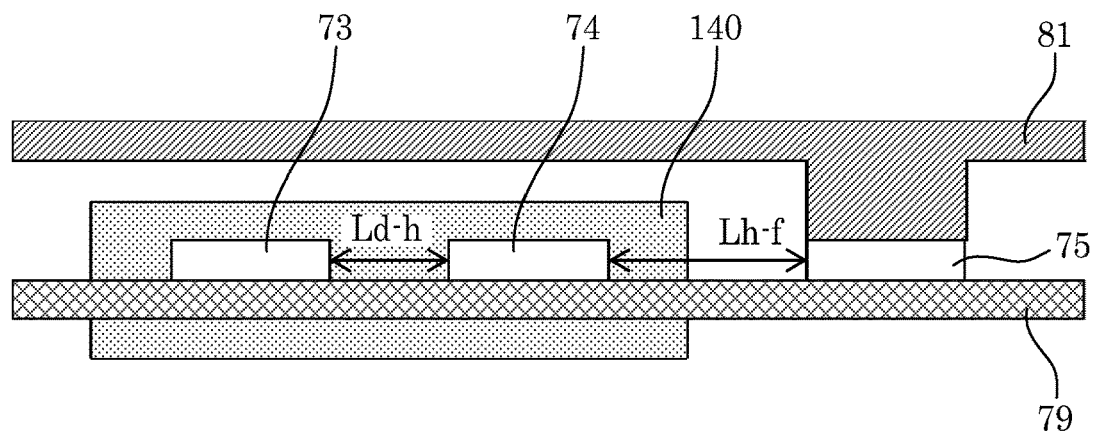
FIG. 16 shows the component layout (relative positional arrangement) of working example 4.
Figure 17:
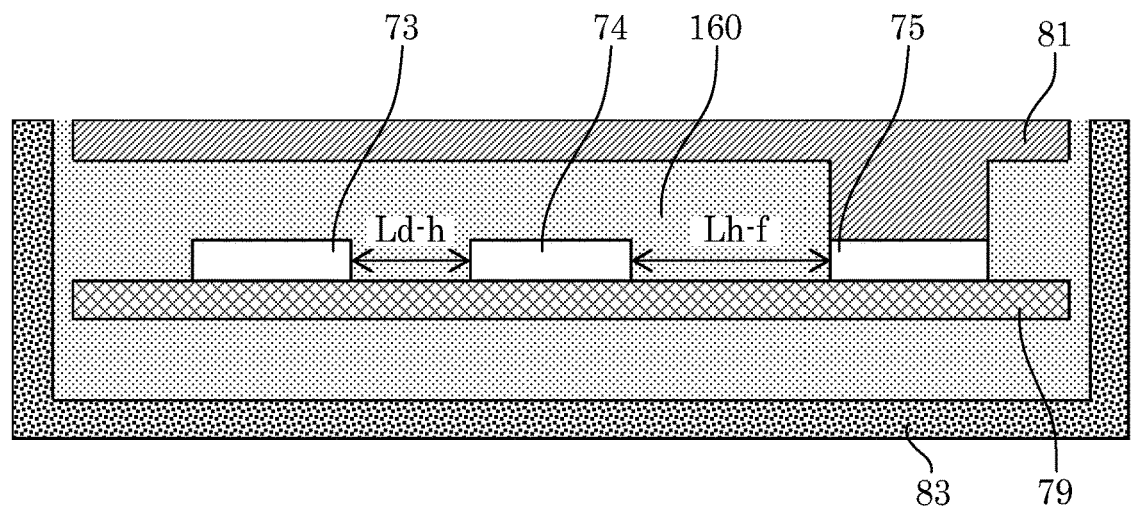
FIG. 17 shows the component layout (relative positional arrangement) of working example 5.

FIGS. 15-17 show positional relationships among the warming-required component 73, the heater 74, the heat-dissipation-required component 75, the substrate 79, and the heat-dissipating member 81 in three different embodiments of the present aspect of the present teachings. In each of the embodiments, the heat of the heat-dissipation-required component 75 is dissipated by (via) the heat-dissipating member 81. In the present working examples, the following relationship is preferably satisfied: "the thermal resistance between the warming-required component 73 and the heater 74"< (is less than) "the thermal resistance between the heater 74 and the heat-dissipation-required component 75." Thereby, the heat of the heater 74 is principally consumed in (by) the warming of the warming-required component 73 and is not consumed in (by) the heating of the heat-dissipation-required component 75.

If the heat of the heater 74 is dissipated to the surrounding atmosphere, then the capability of heating the warming-required component 73 decreases. In the embodiment of FIG. 15, the heater 74 and the warming-required component 73 are housed inside a housing 120, which prevents or at least curtails the dissipation of heat to the atmosphere. In the embodiment of FIG. 16, the dissipation of heat to the atmosphere is prevented or at least curtailed by a hardened bonding agent 140 instead of the housing 120. As shown in the embodiment of FIG. 17, the interior of a housing 83 may instead be filled with a resin-molded body 160.

Figure 18:
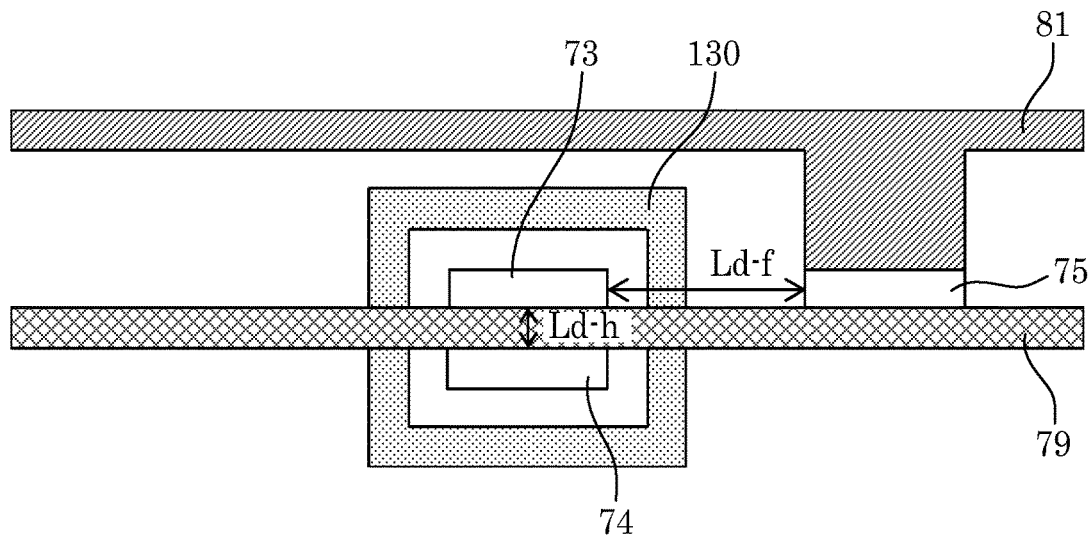
FIG. 18 shows the component layout (relative positional arrangement) of working example 6.
Figure 19:
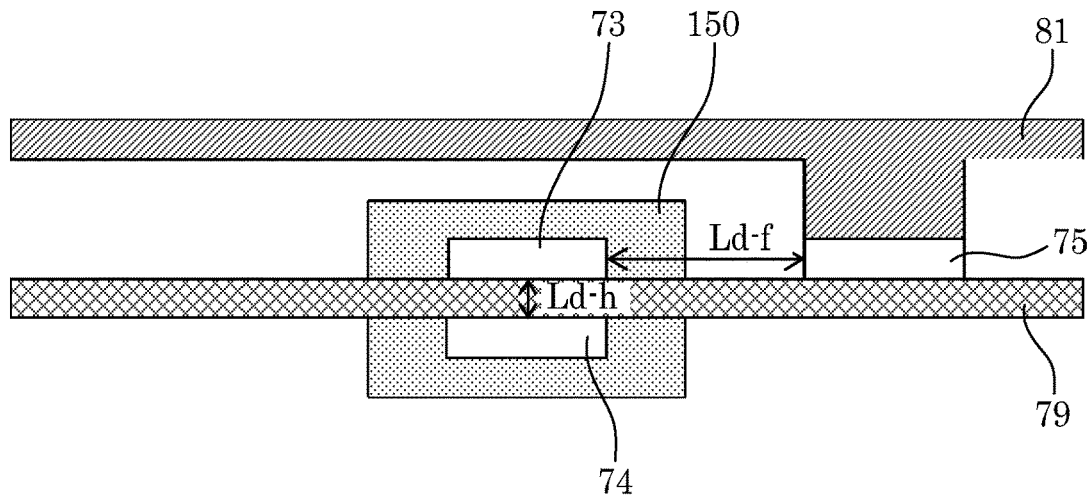
FIG. 19 shows the component layout (relative positional arrangement) of working example 7.
Figure 20:
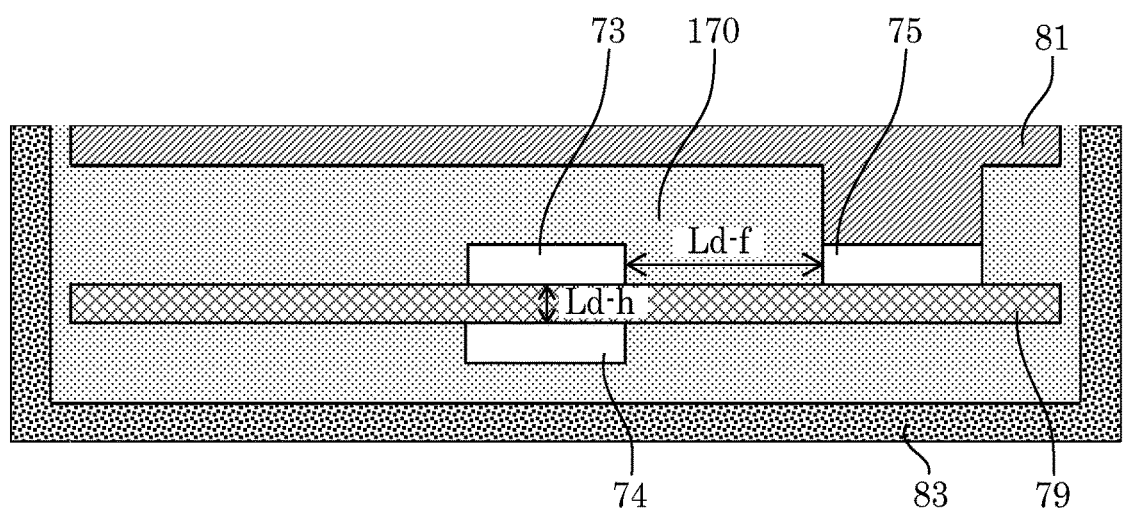
FIG. 20 shows the component layout (relative positional arrangement) of working example 8.

In FIGS. 18-20, the following relationship is preferably satisfied: "the thermal resistance between the warming-required component 73 and the heater 74"< (is less than) "the thermal resistance between the warming-required component 73 and the heat-dissipation-required component 75." In this case, the amount of heat of the heater 74 that is transferred to the heat-dissipation-required component 75 via the warming-required component 73 is decreased, and thus the warming-required component 73 is effectively heated.

In the embodiment of FIG. 18, the heater 74 and the warming-required component 73 are housed inside a housing 130, which prevents or at least curtails the dissipation of heat to the atmosphere. In the embodiment of FIG. 19, the dissipation of heat to the atmosphere is prevented or at least curtailed by a hardened bonding agent 150 instead of the housing 130. As shown in the embodiment of FIG. 20, the interior of the housing 83 may instead be filled with a resin-molded body 170.

In FIGS. 18-20, not only is the following relationship satisfied: "the thermal resistance between the warming-required component 73 and the heater 74"< (is less than) "the thermal resistance between the warming-required component 73 and the heat-dissipation-required component 75," but also the following relationship is satisfied: "the thermal resistance between the warming-required component 73 and the heater 74"< (is less than) "the thermal resistance between the heater 74 and the heat-dissipation-required component 75." By satisfying both relationships, the efficiency of warming the warming-required component by the heater 74 is increased.

FIG. 21 shows an electronic circuit that is completed (closed, becomes operational) when the battery pack 174 (or 174') is mounted on the tool main body 180 and battery-powered portable tool 1 is completed. In this embodiment, the electronic circuit is primarily (mostly) disposed within the battery-powered portable tool 1. A battery cell group 171, in which all-solid-state battery cells are connected, and a battery controller (microprocessor) 172, which measures and controls the state of that battery cell group, are disposed within the battery pack 174 (or 174'). When the battery pack 174 (or 174') is mounted on the tool main body 180, a positive electrode of the battery pack 174 (or 174') and a positive-electrode wire 184 inside the tool main body 180 make contact via a positive-electrode terminal 181, a negative electrode of the battery pack 174 (or 174') and a negative-electrode wire 185 inside the tool main body 180 make contact via a negative-electrode terminal 183, and it becomes possible for the battery controller 172 and the microcontroller 193 to transmit signals via signal terminals 182. A voltage (e.g., the divided voltage explained in FIG. 7 or 9) that indicates the battery temperature, a signal that indicates whether or not the battery is in a chargeable state (CS) using regenerated electric power, and a signal that indicates whether or not the battery is in a discharge-capable state (DS) are sent from the battery controller 172 to the microcontroller 193.

Reference numeral 191 is a constant-voltage power supply that generates a constant voltage that is supplied to the microcontroller 193, etc. Reference numeral 192 is a surge-killer capacitor (also known as a surge-suppressing capacitor or surge-preventing capacitor).

A brushless motor 196 and a sensor circuit 197, which detects the operation state of the motor 196, are disposed within the tool main body 180, and detected values thereof are input to the microcontroller 193. The microcontroller 193 controls the operation of the inverter 195 in accordance with a signal from the battery pack 174 (or 174') and a signal from the sensor circuit 197 and the like. The microcontroller 193 outputs a control signal to a gate driver 194 and, based on the control signal from the microcontroller 193, the gate driver 194 controls the gate voltages of the six transistors built into the inverter 195, and thereby controls the ON/OFF states of the six transistors. The brushless motor 196 is inverter controlled by the microcontroller 193.

Reference numeral 198 is a circuit that rectifies the voltage generated by the continued rotation of the brushless motor 196 owing to inertia (e.g., during a motor-braking operation), and reference numeral 199 is a regenerative brake (a circuit that charges the battery using electric power generated during the motor-braking operation) connected to the CS terminal via a wire 200. When the battery controller 172 enables charging using the regenerated electric power, the operation of the regenerative brake 199 is enabled, and thereby electric power is generated while the rotation owing to the inertia of the brushless motor 196 decelerates. This regenerated power (current) charges the battery cell group 171. On the other hand, when the battery controller 172 is not enabling charging using regenerated electric power, the battery controller 172 disables the operation of the regenerative brake 199. Thereby, it prevents the battery cells (12, 14, 16, 18) from being charged in an inappropriate situation (e.g., when the temperature of the battery cells is too high to permit safe charging), thereby preventing permanent damage to the battery cells and extending the battery service life. When the battery is in the non-discharge-capable state (e.g., because the battery temperature is too high or the remaining battery capacity (charge state) is too low), the battery controller 172 outputs a signal to that effect, the microcontroller 193 stops the operation of the inverter 195, and thereby battery life is prevented from decreasing.

In inverter control, because the transistors that constitute the inverter 195 instantaneously turn both ON and OFF and the electric currents flows to the inductance components that exist in and cause parasitic effects on the battery and the like, surge voltages are generated. To prevent the occurrence of adverse effects due to those surge voltages, the surge-killer capacitor 192 is provided. The required capacitance of the surge-killer capacitor 192 is determined based on the inductance; if the inductance is large, the required capacitance of the surge-killer capacitor 192 also becomes large, and the surge-killer capacitor 192 thereby adversely becomes large in size.

Figure 22:
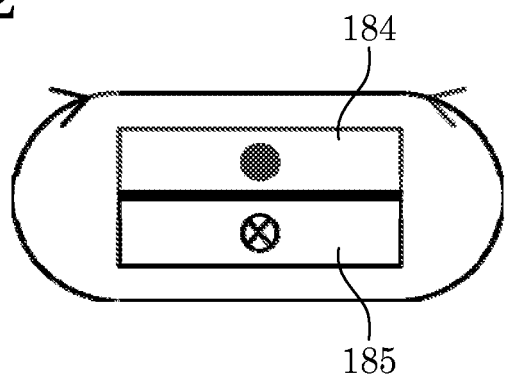
FIG. 22 shows a cross section of wiring that may be utilized in working example 1.
Figure 23:
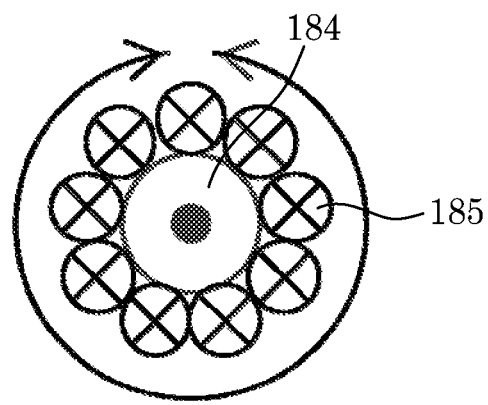
FIG. 23 shows a cross section of wiring that may be utilized in working example 2.
Figure 24:
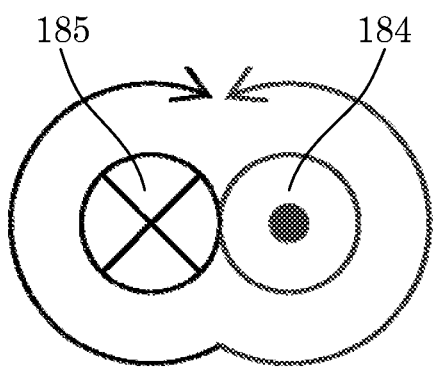
FIG. 24 shows a cross section of wiring that may be utilized in working example 3.

In the case of an all-solid-state battery, inductance can be made smaller than in a lithium-ion battery. If it is assumed that the inductance inside the tool main body is large, then the advantage of the all-solid-state battery making the inductance small can no longer be utilized. In the present working example, a technique is used in which the inductance of electric circuits inside the tool main body 180 is also kept small. As shown in FIG. 21, the interior of the tool main body 180 is extended. Furthermore, the wiring 184, which connects the positive-electrode terminal 181 and the positive electrode of a controller 190, and the wiring 185, which connects the negative-electrode terminal 183 and the negative electrode of the controller 190, extend in parallel in the state in which they oppose one another. FIG. 22 shows a cross-sectional view of the wirings 184, 185 and illustrates that flat surfaces of the flat metal bars (wirings) 184, 185 (rectangular wires) are extended and oppose one another. The inductances generated by the electric currents flowing in directions opposite to the conductors extending in parallel cancel each other out, and thereby the effective inductance is kept small. As shown in FIG. 23, coaxial wire may be used; and as shown in FIG. 24, parallel vinyl-coated wire may be used.

In the case of an all-solid-state battery, cell voltages vary with the type of electrode material. Depending on the type of the electrode material, the cell voltages when fully charged may be in the range of approximately 3.6-6.0 V. Although the minimum cell voltage to prevent overdischarging also varies with the type of the electrode material, the range thereof is small, generally approximately 2.0 V.

If an all-solid-state battery is used in which the cell voltages when fully charged are approximately 6.0 V, then there is a need to take measures in the battery-powered tool to ensure that it can be used without a problem even if the cell voltages vary from 6.0 V to 2.0 V. Regardless of the magnitude of the battery voltage, it becomes necessary to incorporate a circuit that provides constant-speed rotation or constant-torque operation while the operation switch (often a trigger switch) is turned ON, or a circuit that provides constant-speed rotation or constant-torque operation while the amount of manipulation of the trigger switch is fixed. Because the fluctuation range of a battery voltage in which it is necessary to support constant-speed rotation or constant-torque operation is much wider than in the past, a circuit technique for dealing with that becomes necessary.

In addition, even if the battery-pack voltage is the same when fully charged, a phenomenon occurs in which an overdischarge inhibit voltage differs. For example, by connecting three cells, whose cell voltages are 6 V, in series, or by connecting four cells, whose cell voltages are 4.5 V, in series, or by connecting five cells, whose cell voltages are 3.6 V, in series, a battery pack is obtained in which the voltage when fully charged is 18 V.

In this case, if the cell voltage needed to inhibit an overdischarge of the battery cell is 2 V, then a technique that supports 18-6 V is needed in a tool on which a 3×6 V battery pack is mounted; a technique that supports 18-8 V is needed in a tool on which a 4×4.5 V battery pack is mounted; and a technique that supports 18-10 V is needed in a tool on which a 5×3.6 V battery pack is mounted. While these tools have the same maximum (rated) voltage, a technique is needed to individually adjust the minimum voltage that each can support.

The above explained the details of concrete examples of the present invention, but these concrete examples are merely illustrative and do not limit the claims. The techniques described in the claims include a variety of variations and modifications of the concrete examples illustrated above. The technical elements described in the present specification and the drawings exhibit technical utility (practical utility) either individually or in various combinations and are not limited to the combinations described in the claims at the time of the filing of the patent application. In addition, the techniques illustrated in the present specification and the drawings can simultaneously achieve multiple objects, and each technique itself has technical utility (practical utility) by achieving any one of the objects.

Furthermore, although power tools were primarily described that are configured (adapted) to be used while being supported (hand-held) by a user, the present teachings are equally applicable to battery-powered portable tools that are supported on a surface during use, such as a miter saw, a sliding compound miter saw, a lawn mower, an inflator, a compressor, etc.

As was mentioned above, all-solid-state batteries are primarily characterized in that the electrolyte or other conductive material (e.g., semiconductor) that conducts current between two electrodes is solid. In this respect, it is noted that the electrolyte or other conductive material is preferably solid at a temperature of 100° C. or higher, 150° C. or higher, 200° C. or higher or even 300° C. or higher. Thus, the electrolyte or other conductive material in the battery cell(s) remains solid even at elevated operating temperatures for the power tool, such as 100° C. or higher.

The composition of the solid electrolyte or other conductive material is not particularly limited and may comprise or be composed of electrically-conductive semiconductor materials, electrically-conductive ceramics (e.g. oxides, sulfides, phosphates), electrically-conductive glasses or electrically-conductive solid polymers. In one example, the solid electrolyte may comprise or be composed of one or more semiconductor materials or a hydride lithium superionic conductor, which is a solid electrolyte that conducts lithium ions. In another example, the solid electrolyte may comprise or be composed of an electrically-conductive ceramic, such as indium tin oxide (ITO). IZO (Indium Zinc Oxide) and AZO (Aluminum Zinc Oxide) are also possible solid electrolytes according to the present teachings. The anode electrode of the solid-state battery may, e.g., comprise or be composed of lithium metal. The cathode electrode of the solid-state battery may, e.g., comprise or be composed of lithium iron phosphate (LFP) or ITO.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery-powered (cordless) portable tools and battery packs containing all-solid-state battery cells therefor.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Although some aspects of the present disclosure have been described in the context of a device, it is to be understood that these aspects also represent a description of a corresponding method, so that each block or component of a device, such as a controller or microprocessor (e.g., circuits 172 and 193), is also understood as a corresponding method step or as a feature of a method step. In an analogous manner, aspects which have been described in the context of or as a method step also represent a description of a corresponding block or detail or feature of a corresponding device, such as the controller or microprocessor (e.g., circuits 172 and 193).

Depending on certain implementation requirements, exemplary embodiments of the controller or microprocessor (e.g., circuits 172 and 193) of the present disclosure may be implemented in hardware and/or in software. The implementation can be configured using a digital storage medium, for example one or more of a ROM, a PROM, an EPROM, an EEPROM or a flash memory, on which electronically readable control signals (program code) are stored, which interact or can interact with a programmable hardware component such that the respective method is performed.

A programmable hardware component can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

The digital storage medium can therefore be machine- or computer readable. Some exemplary embodiments thus comprise a data carrier or non-transient computer readable medium which includes electronically readable control signals which are capable of interacting with a programmable computer system or a programmable hardware component such that one of the methods described herein is performed. An exemplary embodiment is thus a data carrier (or a digital storage medium or a non-transient computer-readable medium) on which the program for performing one of the methods described herein is recorded.

In general, exemplary embodiments of the present disclosure, in particular the controller or microprocessor (e.g., circuits 172 and 193), are implemented as a program, firmware, computer program, or computer program product including a program, or as data, wherein the program code or the data is operative to perform one of the methods if the program runs on a processor or a programmable hardware component. The program code or the data can for example also be stored on a machine-readable carrier or data carrier. The program code or the data can be, among other things, source code, machine code, bytecode or another intermediate code.

A program according to an exemplary embodiment can implement one of the methods during its performing, for example, such that the program reads storage locations or writes one or more data elements into these storage locations, wherein switching operations or other operations are induced in transistor structures, in amplifier structures, or in other electrical, optical, magnetic components, or components based on another functional principle. Correspondingly, data, values, sensor values, or other program information can be captured, determined, or measured by reading a storage location. By reading one or more storage locations, a program can therefore capture, determine or measure sizes, values, variable, and other information, as well as cause, induce, or perform an action by writing in one or more storage locations, as well as control other apparatuses, machines, and components.

Therefore, although some aspects of the controller or microprocessor (e.g., circuits 172 and 193) may have been identified as "parts" or "steps", it is understood that such parts or steps need not be physically separate or distinct electrical components, but rather may be different blocks of program code that are executed by the same hardware component, e.g., one or more microprocessors.

Additional embodiments of the present teachings include, but are not limited to:

1. A battery-powered portable tool, comprising:
a battery pack containing at least one all-solid-state battery cell within a housing;
a tool main body (housing), on which and/or inside which the battery pack is mountable and from which the battery pack is demountable; and
a battery temperature-measurement circuit disposed in the battery pack or in the tool main body (housing);
wherein the battery temperature-measurement circuit comprises:
a high-temperature measurement circuit configured/adapted to output accurate measurement results in a high-temperature range but is less accurate in a low-temperature range, the high-temperature range preferably differing from the low-temperature range and more preferably the high-temperature range does not overlap the low-temperature range;
a low-temperature measurement circuit configured to output accurate measurement results in the low-temperature range but is less accurate in the high-temperature range; and
a switching apparatus adapted/configured to select and/or output a signal representative or indicative of the battery temperature (e.g., for use in determining the battery temperature) based on (i) an output of the low-temperature measurement circuit when (in response to) an output value of the high-temperature measurement circuit enters (entering) a first abnormal range and (ii) an output of the high-temperature measurement circuit when (in response to) an output value of the low-temperature measurement circuit enters (entering) a second abnormal range, the first abnormal range preferably differing from the second abnormal range and optionally the first abnormal range does not overlap the second abnormal range.

2. The battery-powered portable tool according to the above Embodiment 1, wherein:
the high-temperature measurement circuit comprises a first series circuit in which a thermistor and a first voltage-divider resistor for high temperature are connected in series; and
the low-temperature measurement circuit comprises a second series circuit in which the thermistor and a second voltage-divider resistor for low temperature are connected in series.

3. The battery-powered portable tool according to the above Embodiment 2, wherein the resistance value of the first voltage-divider resistor for high temperature is lower than the resistance value of the second voltage-divider resistor for low temperature.

4. The battery-powered portable tool according to any one of the above Embodiments 1-3, wherein the high-temperature measurement circuit and the low-temperature measurement circuit are contained within the tool main body (housing).

5. The battery-powered portable tool according to any one of the above Embodiments 1-3, wherein the high-temperature measurement circuit and the low-temperature measurement circuit are contained within the battery pack.

6. The battery-powered portable tool according to any one of the above Embodiments 1-5, wherein the lower-limit temperature at which the high-temperature measurement circuit outputs accurate measurement results is higher than the upper-limit temperature at which the low-temperature measurement circuit outputs accurate measurement results.

7. The battery-powered portable tool according to any one of the above Embodiments 1-6, further comprising:
an actuator adapted/configured to operate using electric power supplied by the battery pack, the actuator being contained within the interior of the tool main body;
wherein the following relationship is satisfied:

$$(\text{maximum output of the actuator at } -20° \text{ C.})/(\text{maximum output of the actuator at } +50° \text{ C.}) > 0.5.$$

8. The battery-powered portable tool according to any one of the above Embodiments 1-7 wherein:
an (the) actuator is configured/adapted to operate using electric power supplied by the battery pack, the actuator being contained within the interior of the tool main body;
wherein the tool is adapted/configured to operate the actuator even if the ambient temperature is below 0° C. or lower, as long as the ambient temperature is −30° C. or higher (e.g., the tool is adapted/configured to operate the actuator at ambient temperatures of −30° C. or higher).

9. The battery-powered portable tool according to any one of the above Embodiments 1-8, wherein:
an (the) actuator is configured/adapted to operate using electric power supplied by the battery pack, the actuator being contained with the interior of the tool main body;
wherein the tool is adapted/configured to operate the actuator even if the ambient temperature is +50° C. or higher, as long as the battery temperature is +100° C. or lower (e.g., the tool is adapted/configured to operate the actuator at ambient temperatures of +100° C. or higher).

10. The battery-powered portable tool according to any one of the above Embodiments 1-9, wherein the battery pack has an electric energy storage capacity per unit of battery pack weight of 200 Wh/kg or more.

11. The battery-powered portable tool according to any one of the above Embodiments 1-10, wherein the battery pack has an electric energy storage capacity per unit of battery pack volume of 300 Wh/l or more.

12. The battery-powered portable tool according to any one of the above Embodiments 1-11, wherein the battery temperature-measurement circuit is adapted/configured to determine the temperature of the at least one all-solid-state battery cell based upon the signal representative or indicative of the battery temperature that was selected and/or output by the switching apparatus.

13. The battery-powered portable tool according to any one of the above Embodiments 1-11, further comprising:
a controller adapted/configured to determine the temperature of the at least one all-solid-state battery cell based upon the signal representative or indicative of the battery temperature that was selected and/or output by the switching apparatus.

14. The battery-powered portable tool according to the above Embodiment 13, wherein the controller is disposed in the housing of the battery pack.

15. The battery-powered portable tool according to the above Embodiment 13, wherein the controller is disposed in the tool main body.

16. A battery pack configured/adapted to be mounted on a tool main body, wherein when the battery pack is mounted on the tool main body, a battery-powered tool according to any one of the above Embodiments 1-15 is completed.

17. A battery-powered portable tool, comprising:
- a battery pack containing at least one all-solid-state battery cell within a housing; and
- a tool main body (housing), on which and/or inside which the battery pack is mountable and from which the battery pack is demountable;
- wherein the housing seals the all-solid-state battery cell(s), preferably entirely or completely seals the all-solid-state battery cell(s), from the atmosphere in a water-proof manner,
- the housing does not contain a cooling air passage, and
- the battery pack has an electric energy storage capacity per unit of battery pack weight of 200 Wh/kg or more.

18. The battery-powered portable tool according to the above Embodiment 17, wherein the battery pack has an electric energy storage capacity per unit of battery pack volume of 300 Wh/l or more.

19. A battery-powered portable tool, comprising:
- a battery pack containing at least one all-solid-state battery cell within a housing; and
- a tool main body (housing), on which and/or inside which the battery pack is mountable and from which the battery pack is demountable;
- wherein at least one of the battery pack and the tool main body comprises:
  - a warming-required component,
  - a heat-dissipation-required component,
  - a heater adapted/configured to warm the warming-required component; and
  - a heat-dissipating member adapted/configured to cool (e.g. conduct heat away from) the heat-dissipation-required component.

20. The battery-powered portable tool according to the above Embodiment 19, wherein:
- the warming-required component, the heater, and the heat-dissipation-required component are movable between a first layout (e.g., a first physical configuration) and a second layout (e.g., a second physical configuration); and
- positions of the warming-required component, the heater, and the heat-dissipation-required component in the first layout (e.g., the first physical configuration) differ from the positions of the warming-required component, the heater, and the heat-dissipation-required component in the second layout (e.g., the second physical configuration).

21. The battery-powered portable tool according to the above Embodiment 20, further comprising:
- a bimetal or bimetal strip adapted/configured to move the warming-required component, the heater, and the heat-dissipation-required component between the first layout (e.g., the first physical configuration) and the second layout (e.g., the second physical configuration).

22. The battery-powered portable tool according to the above Embodiment 20 or 21, wherein the warming-required component, the heater, and the heat-dissipation-required component are moved (or are adapted/configured to be moved) between the first layout (e.g., the first physical configuration) and the second layout (e.g., the second physical configuration) in a temperature range of −5° C. to 70° C.

23. The battery-powered portable tool according to the above Embodiment 21 or 22, the bimetal or bimetal strip changes shape at a boundary temperature in the range of 50-70° C.

24. The battery-powered portable tool according to any one of the above Embodiments 20-23, wherein the heat-dissipation-required component does not directly contact the heat-dissipating member in the first layout (e.g., the first physical configuration) and directly contacts the heat-dissipating member in the second layout (e.g., the second physical configuration).

25. The battery-powered portable tool according to any one of the above Embodiments 19-24, wherein the warming-required component requires warming when the temperature is low (e.g., less than 5° C., or less than 0° C., or less than −5° C., etc.).

26. The battery-powered portable tool according to any one of the above Embodiments 19-25, wherein the heat-dissipation-required component requires heat dissipation when the temperature is high (e.g., greater than 50° C., or greater than 60° C., or greater than 70° C., etc.).

27. The battery-powered portable tool according to any one of the above Embodiments 19-26, wherein the battery pack has an electric energy storage capacity of 200 Wh/kg (with respect to the weight of the battery pack) or more and/or 300 Wh/l or more (with respect to the volume of the battery pack).

28. The battery-powered portable tool according to any one of the above Embodiments 19-27, wherein the at least one all-solid-state battery cell shielded and/or sealed, e.g., in a water-proof manner, from the atmosphere (external environment) by the housing.

Any one of the above Embodiments 17-28 may be combined with any one of the above embodiments 1-16, and all such combinations are respectively disclosed herein.

EXPLANATION OF THE REFERENCE NUMBERS

1 Power tool
12, 14, 16, 18 All-solid-state battery cell
20 Control circuit board
22 Positive terminal
24, 28 Solder
26 Negative terminal
29 Positioning boss
30 Upper housing
31 Ridge
32 Positive terminal
33 Contact
34, 40 Insert-molded portion
36, 42 Solder
38 Negative terminal
39 Contact
44 Cover
45 Seal material
46, 48 Hole
50 Lower housing
51, 52 Terminal of tool main body
61 Voltage-dividing resistor (e.g., pull-up resistor)
62 Voltage-dividing resistor (e.g., pull-up resistor)
63 Transistor
64 Thermistor
71 Spring
72 Housing
73 Warming-required component (e.g., control-system electronic component)
74 Warming heater
75 Heat-dissipation-required component (e.g., power-system electronic component)
76 Heat-transfer block
77 Heat-transfer block
78 Bimetal (bimetal strip)
79 Substrate 80 Bimetal heater
81 Heat-dissipating member
82 Screw
171 All-solid-state battery cell group
172 Battery controller
174, 174' Battery pack
180 Tool main body
181 Positive-electrode terminal
182 Signal-terminal group
183 Negative-electrode terminal
184 Positive-electrode wiring
185 Negative-electrode wiring
190 Controller of tool main body
191 Constant-voltage power supply
192 Surge-killer capacitor
193 Microcontroller
194 Gate driver
195 Inverter
196 Motor
197 Sensor circuit
198 Full-wave rectifying circuit
199 Regenerative-braking/regenerative-charging circuit

We claim:

1. A battery-powered portable tool comprising:
a battery pack containing at least one all-solid-state battery cell;
a tool main body, on which and/or inside which the battery pack is mountable and from which the battery pack is demountable; and
a plurality of components;
wherein the plurality of components is disposed in a first layout when the temperature is low and is disposed in a second layout when the temperature is high, the first layout differing from the second layout;
the plurality of components is configured to automatically switch from the first layout to the second layout and vice versa in accordance with a temperature change; and
the plurality of components includes:
a warming-required component, which requires warming when the temperature is lower than a first boundary temperature, and
a heat-dissipation-required component, which requires heat dissipation when the temperature is higher than a second boundary temperature;
the warming-required component and the heat-dissipation-required component are both disposed in one of the battery pack or the tool main body;
the first boundary temperature is lower than the second boundary temperature, and
the plurality of components is switched from the first layout to the second layout and vice versa within a temperature range between the first boundary temperature and the second boundary temperature.

2. The battery-powered portable tool according to claim 1, further comprising:
a bimetal or bimetal strip configured to switch the plurality of components between the first layout and the second layout.

3. The battery-powered portable tool according to claim 1, wherein the temperature range, in which the plurality of components is switched between the first layout and the second layout and vice versa, is between −5° C. and +50° C.

4. The battery-powered portable tool according to claim 2, further comprising:
a heat-dissipating member,
wherein the bimetal or bimetal strip has the property of changing its shape between a first configuration and a second configuration in accordance with temperature, and
the bimetal or bimetal strip is configured such that:
the heat-dissipation-required component and the heat-dissipating member are in a noncontacting state in the first configuration due to the temperature being equal to or lower than the first boundary temperature, and
the heat-dissipation-required component and the heat-dissipating member are brought into contact in the second configuration due to the temperature being equal to or higher than the second boundary temperature.

5. The battery-powered tool according to the claim 4, wherein the bimetal or bimetal strip changes shape such that it switches between the contact state and the noncontacting state at the first boundary temperature.

6. The battery-powered tool according to claim 4, wherein the bimetal or bimetal strip changes shape such that it switches between the contact state and the noncontacting state at the second boundary temperature.

7. The battery-powered tool according to claim 1, wherein:
the warming-required component includes a microprocessor, and
the heat-dissipation-required component includes an inverter having at least one transistor.

8. The battery-powered portable tool according to claim 7, further comprising:
a bimetal or bimetal strip configured to switch the plurality of components between the first layout and the second layout by changing its shape between a first configuration and a second configuration and vice versa in accordance with temperature; and
a heat-dissipating member,
wherein:
the temperature range, in which the plurality of components is switched by the bimetal or bimetal strip from the first layout to the second layout and vice versa, is between −5° C. and +50° C., and
the bimetal or bimetal strip is configured such that:
the heat-dissipation-required component and the heat-dissipating member are in a noncontacting state in the first configuration due to the temperature being equal to or lower than the first boundary temperature, and
the heat-dissipation-required component and the heat-dissipating member are brought into contact in the second configuration due to the temperature being equal to or higher than the second boundary temperature.

9. A battery-powered portable tool comprising:
a battery pack containing at least one all-solid-state battery cell;
a tool main body, on which and/or inside which the battery pack is mountable and from which the battery pack is demountable; and
a plurality of components;
wherein:
the plurality of components is arranged in a first physical configuration in a first temperature range, the plurality of components is arranged in a second physical configuration in a second temperature range that is higher than the first temperature range, the first physical configuration differs from the second physical configuration, the plurality of components is configured to automatically switch:

from the first physical configuration to the second physical configuration in response to a change from the first temperature range to the second temperature range, and from the second physical configuration to the first physical configuration in response to a change from the second temperature range to the first temperature range, and the plurality of components comprises:

a warming-required component that requires warming when the temperature is lower than a first boundary temperature, and a heat-dissipation-required component that requires heat dissipation when the temperature is higher than a second boundary temperature; and wherein:

the warming-required component and the heat-dissipation-required component are both disposed in one of the battery pack or the tool main body;

the first boundary temperature is lower than the second boundary temperature, and the plurality of components is configured to be switched from the first physical configuration to the second physical configuration and vice versa between the first boundary temperature and the second boundary temperature.

10. The battery-powered portable tool according to claim 9, further comprising:

a bimetal or bimetal strip configured to switch the plurality of components between the first physical configuration and the second physical configuration.

11. The battery-powered portable tool according to claim 9, wherein the plurality of components is switched from the first physical configuration to the second layout and vice versa between −5° C. and +50° C.

12. The battery-powered portable tool according to claim 10, further comprising:

a heat-dissipating member, wherein the bimetal or bimetal strip changes from a first shape to a second shape and vice verso in accordance with a change in temperature, and the bimetal or bimetal strip is configured to cause:

the heat-dissipation-required component to be spaced apart from the heat-dissipating member while the temperature is equal to or lower than the first boundary temperature and the bimetal or bimetal strip has assumed the first shape, and the heat-dissipation-required component to contact the heat-dissipating member while the temperature is equal to or higher than the second boundary temperature and the bimetal or bimetal strip has assumed the second shape.

13. The battery-powered tool according to the claim 12, wherein the bimetal or bimetal strip changes from the first shape to the second shape or vice versa in a temperature range encompassing the first boundary temperature.

14. The battery-powered tool according to the claim 12, wherein the bimetal or bimetal strip changes from the first shape to the second shape or vice versa in a temperature range encompassing the second boundary temperature.

15. The battery-powered tool according to claim 9, wherein:

the warming-required component includes a microprocessor, and the heat-dissipation-required component includes an inverter having at least one transistor.

16. The battery-powered portable tool according to claim 15, further comprising:

a bimetal or bimetal strip configured to switch the plurality of components between the first physical configuration and the second physical configuration and vice versa by changing from a first shape to a second shape and vice versa in accordance with a change in temperature; and a heat-dissipating member, wherein:

the temperature range, in which the plurality of components is switched by the bimetal or bimetal strip from the first physical configuration to the second physical configuration and vice versa, is between −5° C. and +50° C., and the bimetal or bimetal strip is configured to cause:

the heat-dissipation-required component to be spaced apart from the heat-dissipating member while the temperature is equal to or lower than the first boundary temperature and the bimetal or bimetal strip has assumed the first shape, and the heat-dissipation-required component to directly contact the heat-dissipating member while the temperature is equal to or higher than the second boundary temperature and the bimetal or bimetal strip has assumed the second shape.

17. A battery-powered portable tool comprising:

a battery pack containing at least one all-solid-state battery cell;

a tool main body, on which and/or inside which the battery pack is mountable and from which the battery pack is demountable;

a warming-required component, which requires warming when the temperature is lower than a first boundary temperature; and a heat-dissipation-required component, which requires heat dissipation when the temperature is higher than a second boundary temperature;

wherein:

the warming-required component and the heat-dissipation-required component are both disposed in one of the battery pack or the tool main body;

the first boundary temperature is lower than the second boundary temperature;

a first layout of the warming-required component and the heat-dissipation-required component automatically switches in response to a temperature change to a second layout of the warming-required component and the heat-dissipation-required component and vice versa within a temperature range between the first boundary temperature and the second boundary temperature; and the first layout differs from the second layout.

18. The battery-powered portable tool according to claim 17, wherein:

the warming-required component includes a microprocessor, and the heat-dissipation-required component includes an inverter having at least one transistor.

19. The battery-powered portable tool according to claim 17, further comprising:
a heat-dissipating member; and
a bimetal or bimetal strip;
wherein the bimetal or bimetal strip has the property of changing its shape between a first configuration and a second configuration in accordance with temperature, and
the bimetal or bimetal strip is configured such that:
the heat-dissipation-required component and the heat-dissipating member are in a noncontacting state in the first layout due to the temperature being equal to or lower than the first boundary temperature, and
the heat-dissipation-required component and the heat-dissipating member are brought into contact in the second layout due to the temperature being equal to or higher than the second boundary temperature.

20. The battery-powered portable tool according to claim 17, wherein the temperature range, in which the plurality of components is switched between the first layout and the second layout and vice versa, is between −5° C. and +50° C.

* * * * *